(12) United States Patent
Arges et al.

(10) Patent No.: US 12,515,177 B2
(45) Date of Patent: Jan. 6, 2026

(54) RESIN WAFER TECHNOLOGIES WITH SOLUTION PROCESSABLE IONOMERS

(71) Applicant: Board of Supervisors of Louisiana State University and Agricultural and Mechanical College, Baton Rouge, LA (US)

(72) Inventors: Christopher George Arges, Baton Rouge, LA (US); Varada Menon Palakkal, Baton Rouge, LA (US); Matthew Leo Jordan, Baton Rouge, LA (US)

(73) Assignee: BOARD OF SUPERVISORS OF LOUISIANA STATE UNIVERSITY AND AGRICULTURAL AND MECHANICAL COLLEGE, Baton Rouge, LA (US)

( * ) Notice: Subject to any disclaimer, the term of this patent is extended or adjusted under 35 U.S.C. 154(b) by 699 days.

(21) Appl. No.: 17/797,926

(22) PCT Filed: Feb. 5, 2021

(86) PCT No.: PCT/US2021/016824
§ 371 (c)(1),
(2) Date: Aug. 5, 2022

(87) PCT Pub. No.: WO2021/158919
PCT Pub. Date: Aug. 12, 2021

(65) Prior Publication Data
US 2023/0077400 A1 Mar. 16, 2023

Related U.S. Application Data

(60) Provisional application No. 62/971,141, filed on Feb. 6, 2020.

(51) Int. Cl.
| | | |
|---|---|---|
| *B01D 71/52* | (2006.01) | |
| *B01D 61/46* | (2006.01) | |
| *B01D 67/00* | (2006.01) | |
| *B01D 69/14* | (2006.01) | |
| *B01J 21/04* | (2006.01) | |
| *B01J 35/45* | (2024.01) | |
| *C02F 1/469* | (2023.01) | |

(52) U.S. Cl.
CPC ....... *B01D 71/5222* (2022.08); *B01D 61/463* (2022.08); *B01D 67/0079* (2013.01); *B01D 69/145* (2013.01); *B01J 21/04* (2013.01); *B01J 35/45* (2024.01); *C02F 1/4695* (2013.01); *B01D 2325/42* (2013.01)

(58) Field of Classification Search
CPC .............. B01D 71/5222; B01D 61/463; B01D 67/0079; B01D 69/145; B01D 2325/42; B01J 35/23; B01J 21/04; C02F 1/4695
USPC .......................................................... 502/4
See application file for complete search history.

(56) References Cited

U.S. PATENT DOCUMENTS

| | | | |
|---|---|---|---|
| 2008/0160351 A1 | 7/2008 | Felix et al. | |
| 2010/0326833 A1 | 12/2010 | Messalem | |
| 2018/0162752 A1 | 6/2018 | Van Der Wal et al. | |
| 2019/0134570 A1* | 5/2019 | Pintauro | ................ B01D 71/82 |

FOREIGN PATENT DOCUMENTS

| | | |
|---|---|---|
| CN | 100522323 C | 8/2009 |
| EP | 3222349 A1 | 9/2017 |

OTHER PUBLICATIONS

Snyder, et al., "Energy-efficient resin wafer electrodeionization for impaired water reclamation", 1464-1474, Journal of Cleaner Production, Feb. 2018.
International Search Report for PCT/US21/16824 mailed Jul. 15, 2021.
EP Search Report for PCT/US2021016824 mailed Feb. 8, 2024.
Pan, et al., "Energy-efficient resin wafter electrodeionization for impaired water reclamation", Journal of Cleaner Production, Nov. 2017.

* cited by examiner

*Primary Examiner* — Patricia L. Hailey
(74) *Attorney, Agent, or Firm* — Thomas | Horstemeyer, LLP

(57) ABSTRACT

Various examples related to resin wafer technologies including ionomers and resin wafers with solution processable ionomers and their production are provided. In one example, a wafer includes an ion conducting layer having ion-exchange resin particles and an ionomer binder coating the ion-exchange resin particles. The ionomer binder can bind the ion-exchange resin particles together in the ion conducting layer. In another example, the wafer can contain water dissociation catalysts for promoting water-splitting in the wafers.

13 Claims, 22 Drawing Sheets

CEI binder
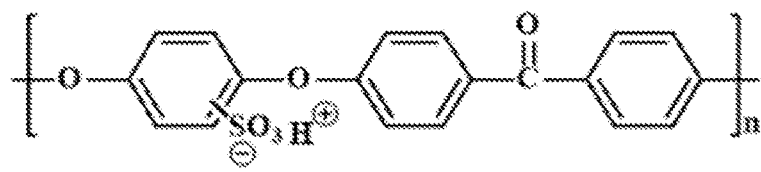
AEI binder
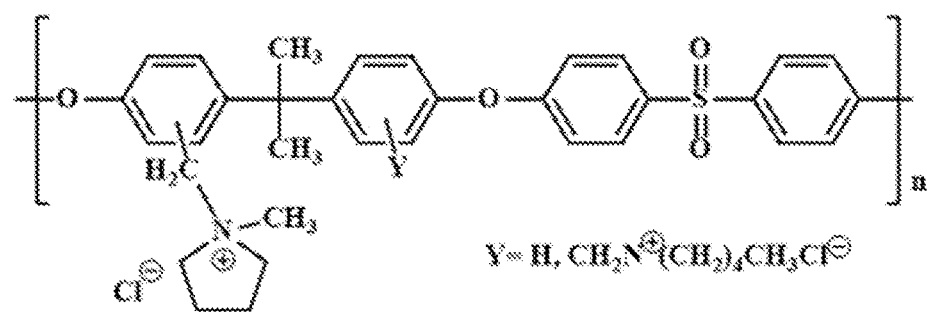
FIG. 1A
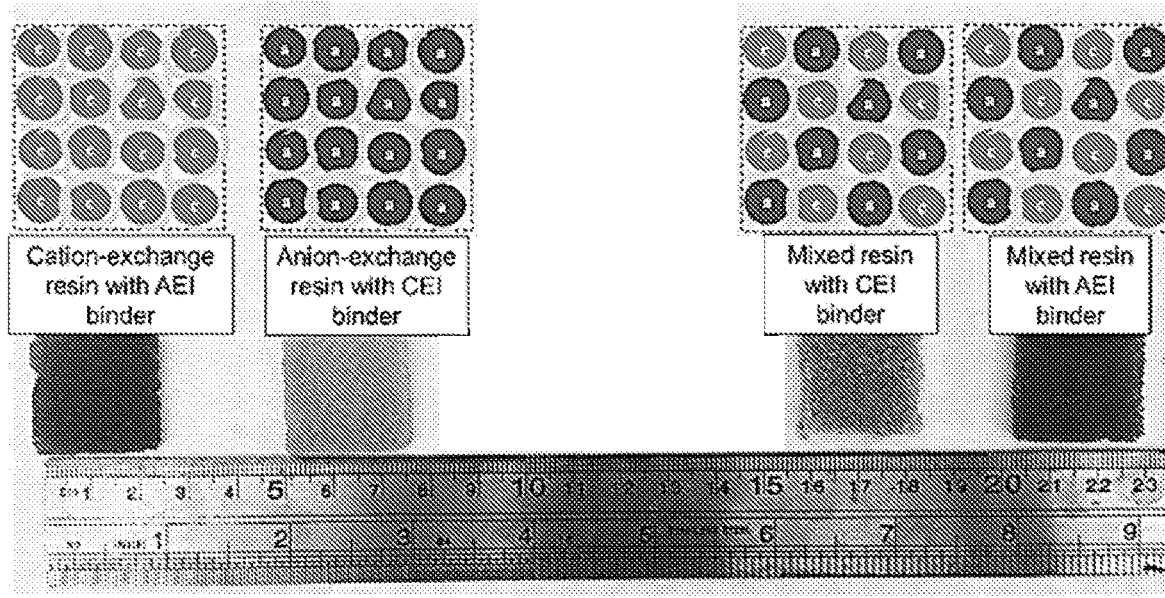
FIG. 1B

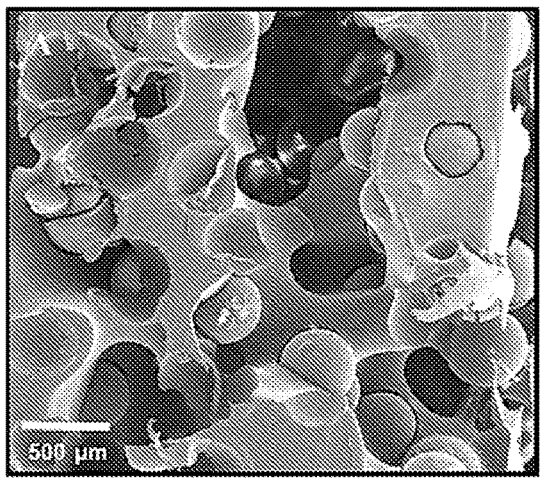 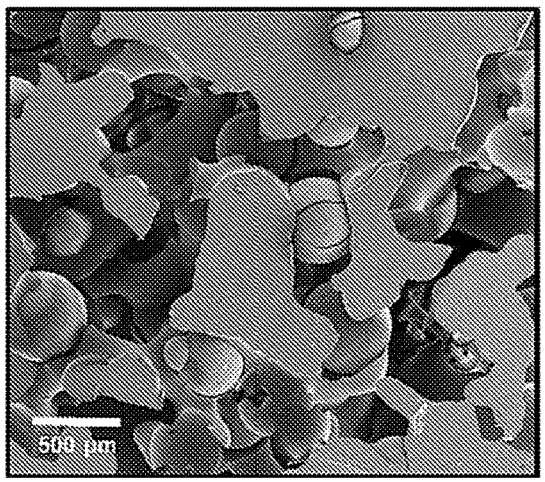
cross-section     FIG. 3A     surface
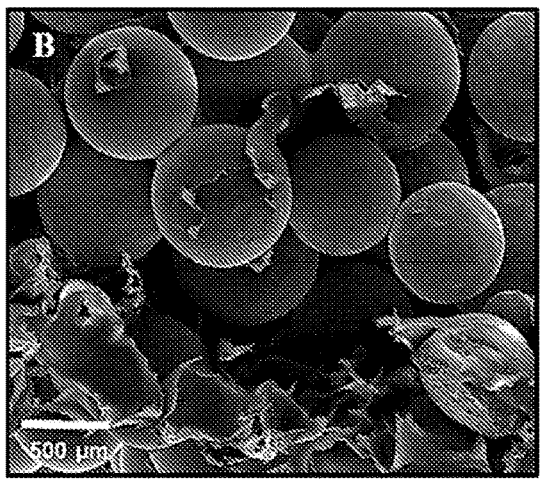 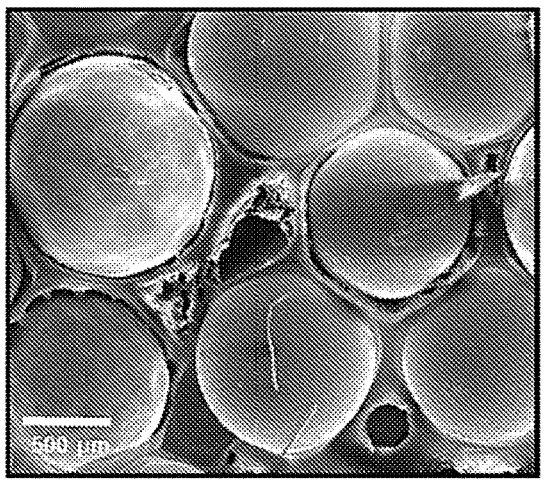
cross-section     FIG. 3B     surface
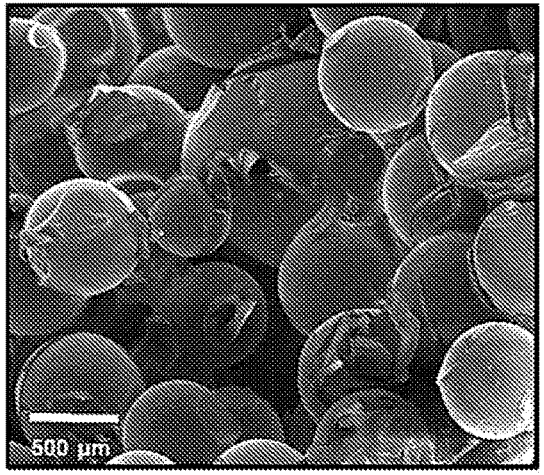 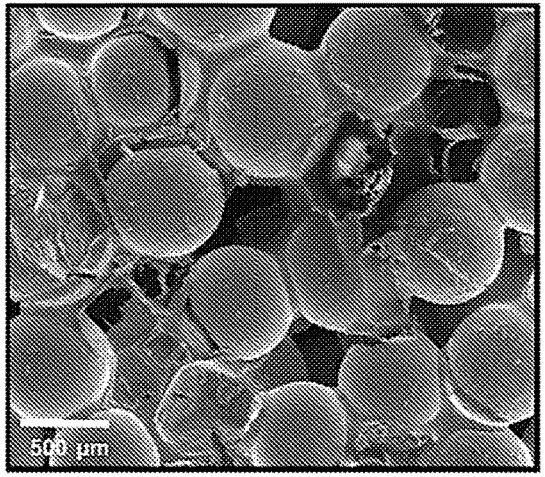
cross-section     FIG. 3C     surface

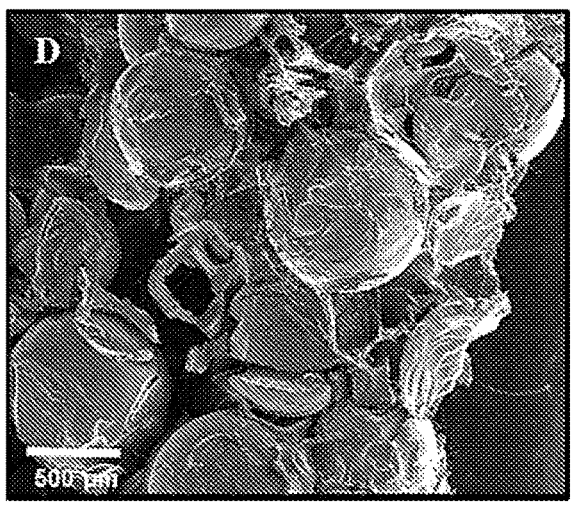
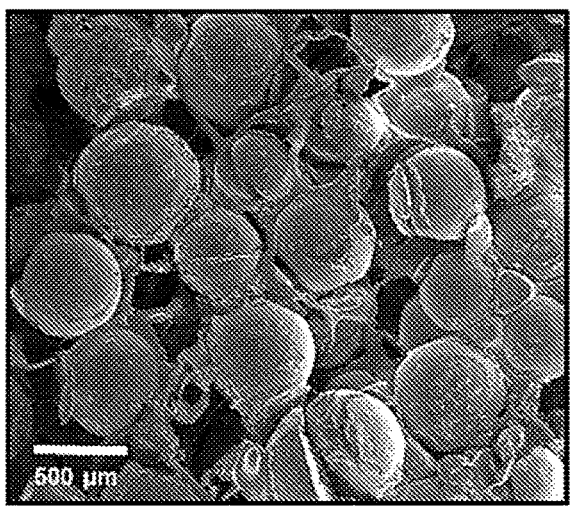
cross-section     FIG. 3D     surface
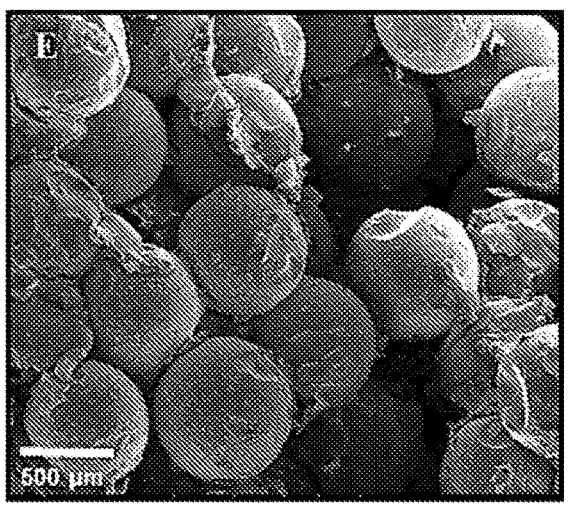
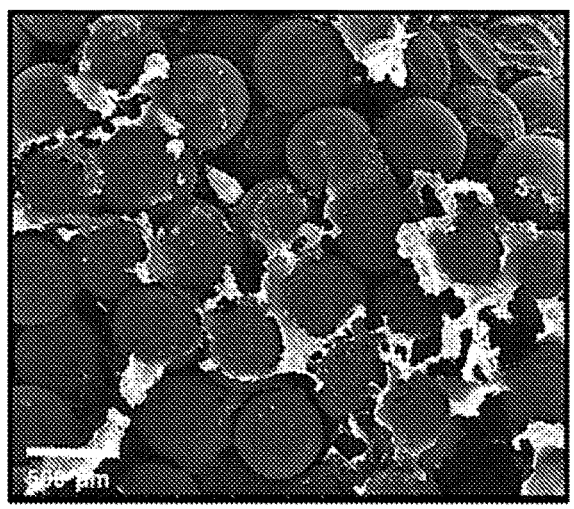
cross-section     FIG. 3E     surface

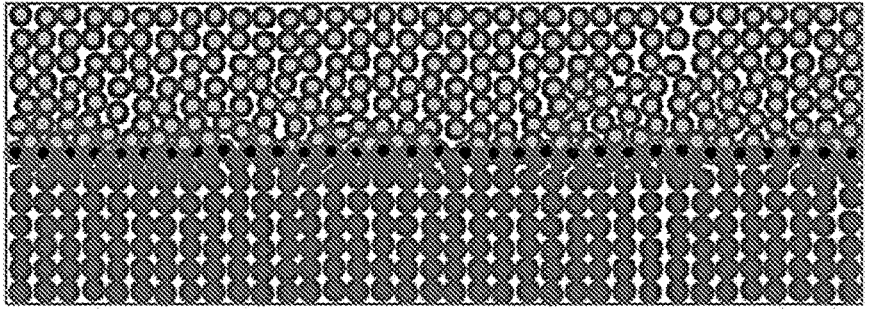
FIG. 14D D. Bilayer Janus Bipolar Resin Wafer
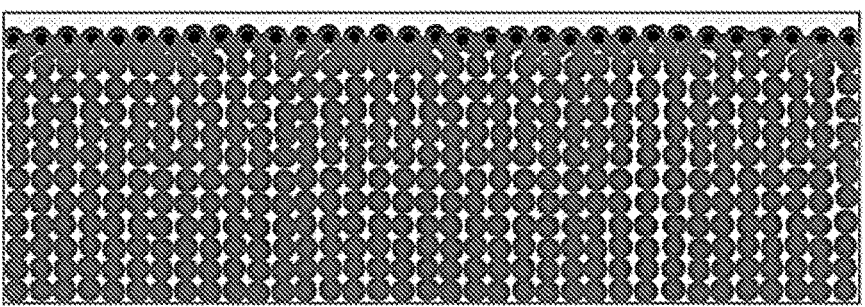
FIG. 14C C. Reverse Asymmetric Janus Bipolar Resin Wafer
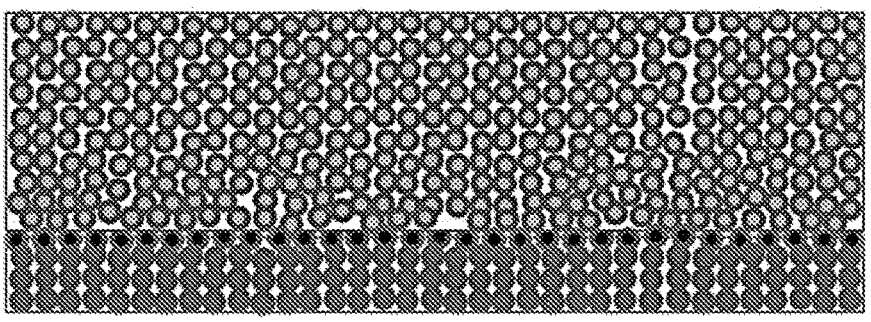
FIG. 14B B. Asymmetric Janus Bipolar Resin Wafer
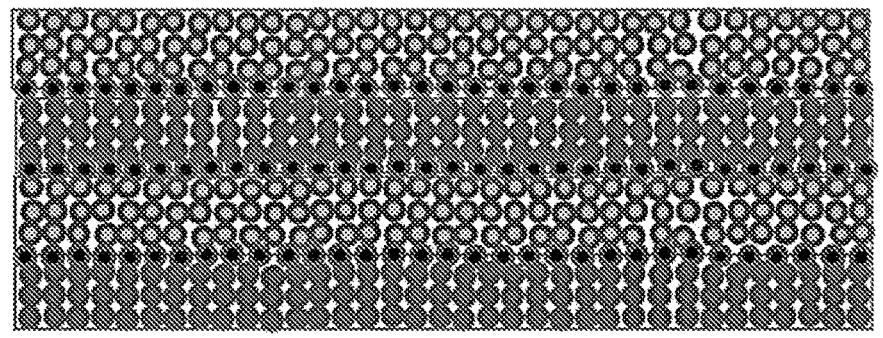
FIG. 14A A. Symmetric Janus Bipolar Resin Wafer

RESIN WAFER TECHNOLOGIES WITH SOLUTION PROCESSABLE IONOMERS

CROSS REFERENCE TO RELATED APPLICATIONS

This application is the 35 U.S.C. § 371 national stage application of PCT Application No. PCT/US2021/016824, filed Feb. 5, 2021, which claims priority to, and the benefit of, U.S. Provisional Application No. 62/971,141, filed Feb. 6, 2020, both of which are hereby incorporated by reference herein in their entireties.

STATEMENT REGARDING FEDERALLY SPONSORED RESEARCH OR DEVELOPMENT

This invention was made with government support under DE-AC02-06CH11357 awarded by the Department of Energy. The Government has certain rights in the invention.

BACKGROUND

Electrochemical separations, which primarily consist of electrodialysis (ED), electrodeionization (EDI), electro-swing adsorption, and membrane capacitive deionization (MCDI/CDI), are a subset of technologies primarily used for deionization and other water treatment processes. These technologies offer distinct advantages for desalination over osmotic based technologies (e.g., reverse osmosis) in certain scenarios such as treatment of hypersaline solutions, selective ionic sorption, and deionization of liquid streams with relatively low dissolved ionic species concentrations (e.g., brackish water with less than 5,000 mg $L^{-1}$). Despite these advantages, both electrochemical and osmotic based separation technologies will continue to undergo materials research and process development because of the current stresses on global water resources, which are due to climate change and the increasing water, food, and energy demands associated with a growing population.

SUMMARY

Aspects of the present disclosure are related to resin wafer technologies including ionomers and resin wafers with solution processable ionomers. In one aspect, among others, a wafer comprises an ion conducting layer comprising: ion-exchange resin particles; and an ionomer binder coating the ion-exchange resin particles, the ionomer binder binding the ion-exchange resin particles together in the ion conducting layer. In various aspects, the ion-exchange resin particles can comprise a plurality of ion-exchange resin particle types. The ionomer binder can comprise a cation-exchange ionomer (CEI). The CEI can comprise sodium sulfonate poly (ether ether ketone) (SPEEK) or types of sulfonated based poly(arylene) chemistries. The ionomer binder can comprise an anion-exchange ionomer (AEI). The AEI can comprise quaternary benzyl n-methyl pyrrolidinium chloride poly (arylene ether sulfone) or other types of quaternary ammonium (or phosphonium or imidazolium) based poly(arylene) chemistries. The ionomer binder can further comprise a cation-exchange ionomer (CEI).

In one or more aspects, the wafer can comprise a catalyst layer disposed on the ion conducting layer or distributed throughout the layer. The ion conducting layer can comprise a water dissociation catalyst. The water dissociation catalyst can comprise $Al(OH)_3$ nanoparticles. The wafer can comprise an ion-exchange layer disposed on the catalyst layer opposite the ion conducting layer. The ion-exchange resin particles can be anion exchange resin particles. The ionomer binder can comprise an anion-exchange ionomer (AEI), and the ion-exchange layer can comprise a cation-exchange ionomer (CEI). The catalyst layer can be located between the ion conducting layer and a second ion conducting layer. The second ion conducting layer can comprise cation-exchange resin particles; and a cation-exchange ionomer coating the cation-exchange resin particles, the cation-exchange ionomer binding the cation-exchange resin particles together in the second ion conducting layer.

In some aspects, the wafer can comprise second ion conducting layer comprising: second ion-exchange resin particles; and a second ionomer binder coating the second ion-exchange resin particles, the second ionomer binder binding the second ion-exchange resin particles together in the second ion conducting layer. The wafer can comprise an ion-exchange layer located between the ion conducting layer and the second ion conducting layer. The ion conducting layer can be an anion conducting layer, the second ion conducting layer is a cation conducting layer, and the ion-exchange layer comprises a cation-exchange ionomer (CEI).

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A-1C illustrate examples of (A) chemical structures of ionomer polymer binders for resin wafers: (CEI: sodium sulfonate poly(ether ether ketone) (SPEEK) and AEI: quaternary benzyl n-methyl pyrrolidinium chloride poly(arylene ether sulfone)); (B) graphical representation and photographs of the 4 new resin wafer (RW) ionomer binder materials; and (C) manufacturing scheme to prepare ionomer binder RWs, in accordance with various embodiments of the present disclosure.

FIGS. 3A-3E are scanning electron microscope (SEM) images (left: cross-section and right: surface) of examples of RWs including: (A) mixed resin with PE binder; (B) mixed resin with CEI binder; (C) mixed resin with AEI binder; (D) anion exchange resin (AER) with CEI binder; and (E) cation exchange resin (CER) with AEI binder, in accordance with various embodiments of the present disclosure.

FIGS. 4A-4C illustrate (A) concentration of concentrate and diluate streams versus time; (B) removal productivity of NaCl (i.e., ion removal flux) vs removal ratio; and (C) energy consumption for $Cl^-$ removal. Two EDI runs were performed with each RW material. The average result is given, and the error bar represents the difference between the average and one of the collected data points, in accordance with various embodiments of the present disclosure.

FIGS. 14A-14D illustrate examples of (A) symmetric and (B) asymmetric Janus bipolar resin wafers and examples of (C) reversed asymmetric and (D) bilayer Janus bipolar resin wafers catalyst, in accordance with various embodiments of the present disclosure.

DETAILED DESCRIPTION

Figure 1C:
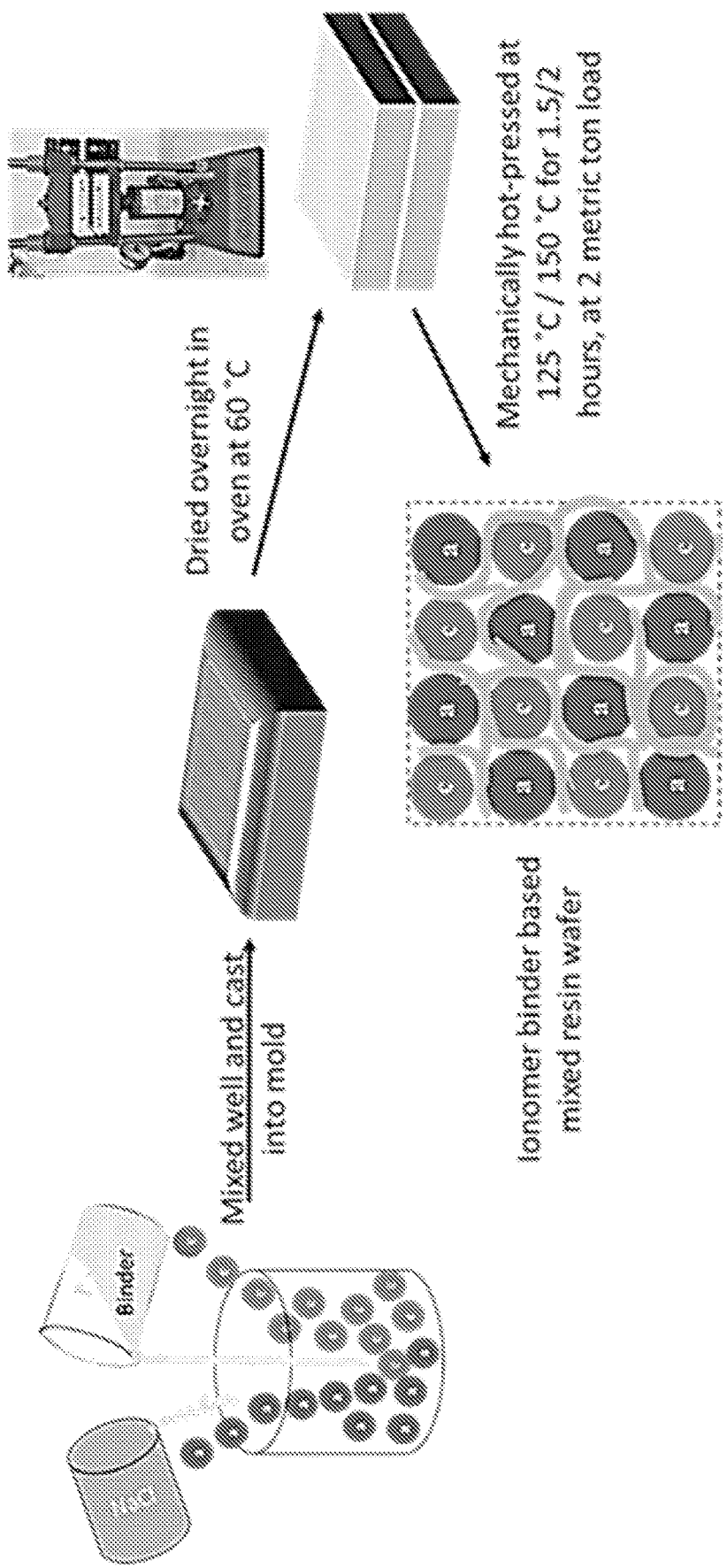

Disclosed herein are various examples related to ionomers and resin wafers with solution processable ionomers. For example, conductive ionomer binders can immobilize ion-exchange resin particles into porous wafer structures for use in electrodeionization (EDI). EDI is a commercial technology that delivers ultrapure water for numerous industrial applications including power generation, pharmaceutical formulation, and semiconductor manufacturing. It is also part of an electrochemical separations technology portfolio that can be applied for remediating diluate, yet hazardous charged species (e.g., heavy metal ions, pesticides, and pharmaceuticals), from ground water and industrial wastewater streams. To improve the energy efficiency and performance of EDI, there is a need to devise advanced materials that address ohmic resistances for separations performed with challenging, dilute aqueous solutions. This disclosure disseminates a new class of ion-exchange resin wafers (RWs) fabricated with ion-conductive binders using a versatile and scalable process. The new RWs displayed superb ionic-conductivity, 3- to 5-fold improvement, over conventional RWs made with a non-ionic binder, and this improved EDI's desalination rate and energy efficiency. Further, both mixed conducting (anion and cation conducting) and single ion conducting resin wafers can be realized. The resin wafers could also be formulated and prepared with water dissociation catalysts for splitting water and regenerating the ion-exchange resins and augmenting ionic conductivity. Reference will now be made in detail to the description of the embodiments as illustrated in the drawings, wherein like reference numbers indicate like parts throughout the several views.

EDI is a commercial separation technology primarily deployed for ultrapure water production and remediation of industrial process waste streams. Its modular design and flexible operating parameters make it uniquely versatile to carry-out a wide-range of ionic separations for various applications (e.g., through modulation of the applied electric field and modification of the membrane/RW configuration in the EDI cell stack). EDI is similar to ED in the way that both EDI and ED devices utilize the same basic structure comprising two electrodes that are separated by a stack of alternating liquid compartments, which are partitioned by alternating cation and anion exchange membranes. Application of an electric field drives the transport of ions towards their respective, oppositely charged electrode. As a result, charged species are continuously removed from the diluate chambers and transferred into the adjacent concentrate chambers. Commercial EDI differs from ED in the way that its traditional design features loosely packed cation and anion exchange resin (CER and AER) particles in the diluate liquid chamber. These resins augment the ionic conductivity of dilute aqueous solutions in the diluate chamber of EDI. By lowering the ohmic resistances in the diluate compartment, the EDI stack is far more effective, from a thermodynamic efficiency standpoint, for removing ions in the more challenging dilute concentration regime.

A drawback of conventional EDI is the utilization of loose resin beads that foster inconsistent process performance, stack leakage, and disruption of bulk liquid flow. In addition to these challenges, the loose particle bed in EDI requires routine maintenance. Over the past two decades, researchers have addressed some of the challenges associated with EDI by substituting the packed compartment comprising loose ion-exchange resin particles with a rigid yet porous, ion-exchange resin wafer (RW) in which the ion-exchange resin particles are immobilized. The RW constitutes a mixture of CER and AER bound by polyethylene (PE) —a thermoplastic polymer. The ion-exchange resin beads supplement ionic conductivity and ion-exchange across the RW, while the PE binder keeps the resin beads stationary. Conventional RWs are about 20 to 35% porous and contain macropores that facilitate bulk liquid flow. Previous work has shown that RW-EDI provides significant advantages over conventional EDI in terms of the rate of removal of ions from liquids, energy efficiency, and process stability and consistency To date, little material innovation has occurred for RW materials. The first generation of RW materials incorporated a latex based binder, but this was later replaced by a thermoplastic polymer like PE that exhibited better ionic separation and efficiencies and required shorter processing time for wafer manufacture. The ion-exchange resin bead chemistry has remained the same in RWs for desalination applications, and most activities related to manufacturing RW materials has focused on the composition of the RW (i.e., the binder content, porosigen amount, and the ion-exchange resin particles' content), and variation of the type of resin particles, which affects ion binding affinities and the ion-exchange capacity (IEC). The porosigen added to the RW during manufacturing serves as a sacrificial component that is leached in the final processing step to yield a porous bed material.

Although the RW has a successful track record for augmenting the ionic conductivity of the diluate liquid streams and assisting in ion removal by ion-exchange, at the start of this work, it was posited that the presence of the non-conductive binder in the RW limits energy efficiency gains in EDI. Additionally, it was hypothesized that the non-conductive nature of the PE compromises the population of bipolar junction sites in the RW. These bipolar junctions are formed at the interface where CERs come into contact with AERs. The oppositely charged tethered ionic moieties at this interface lead to an abrupt p-n type junction that dissociates water under an applied electric field. Under dilute conditions, the electric field drives water-splitting forming hydronium ($H^+$) and hydroxide ($OH^-$) ion carriers that enable electrical current flow in the unit, and these ions may undergo four fates: i.) they participate in ion-exchange with the resin-particles to regenerate the bed; ii.) they migrate to their respective ion-exchange membrane and are transferred into the concentrate liquid compartment; iii.) they recombine to form water; and iv.) the ions leave in the effluent stream, in different ratios, leading to a change in pH. Note that water-splitting in EDI has not been extensively studied, and there is mild evidence to suggest that the phenomenon even occurs. All observations for water-splitting in the ion-exchange resin bed in EDI derive from measuring pH changes in the effluent stream and analyzing the device's current efficiency. Note that water-splitting can also occur at the solution-ion-exchange membrane interface under the application of large voltages in ED resulting in pH changes of the effluent. It is posited that ineffective water-splitting in the ion-exchange resins may hinder deionization and current efficiency of EDI, and the lack of scientific reports studying the effect justifies more inquiry. To recap, it is likely that a PE binder would not only derail the ionic conductivity of the RW but would also jeopardize the population of bipolar junction regions needed for water-splitting.

This disclosure presents the development and implementation of a new class of ion-exchange resin wafers (RWs) fabricated with ion-conductive binders, which can be prepared using a versatile process. The RWs prepared with ionomer binders exhibited exceptional ionic conductivities—a 3-5-fold improvement over conventional RWs that contain a non-ionic polyethylene binder. Incorporation into an EDI stack (RW-EDI) resulted in an increased desalination rate while reducing the energy needed for desalination in comparison to the use of conventional RWs. This disclosure also investigates the phenomenon of water-splitting directly in the RW using an external experimental setup. Polarization curves of the RWs suggest that limited water-splitting hails from the absence of a water dissociation catalyst in the RW. Overall, it is demonstrated that ohmic resistances can be substantially curtailed with ionomer binder RWs at dilute salt concentrations, and the insights into water-splitting phenomenon in RWs can be utilized for the design of the next generation of porous ion-conducting materials for EDI.

Conductive Ionomer Binders that Immobilize Ion-Exchange Resin Particles into Porous Wafer Substrates This disclosure presents the manufacture and performance of ionomer binder RWs with different configurations: i.) mixed resin with a cation exchange ionomer (CEI) binder, ii.) anion exchange resin (AER) only with CEI binder, iii.) mixed resin with an anion exchange ionomer (AEI) binder, and iv.) cation exchange resin (CER) only with AEI binder. The new class of ionomer binder RWs necessitated a new manufacturing method when compared to PE based RWs because PE is a thermoplastic that becomes a polymer melt above 120° C. Ionomer binders, without plasticizers, exhibit higher glass transition temperatures (e.g., the glass transition temperature for sulfonated poly(ether ether ketone) (SPEEK) is above 200° C.) making a direct thermal-polymer melt process elusive. The solution processable ionomer based binders were based on poly(arylene ether) chemistries that were converted into ionomers using simple reaction schemes with commercially available polymers. Poly (arylene) chemistries may also be converted into ionomers.

The new ionomer binder RWs showed an impressive 3- to 5-fold improvement in ionic conductivity in the presence of dilute sodium chloride (NaCl) solution concentrations (≤500 mg L$^{-1}$, the most challenging condition). These materials also demonstrated 2- to 3-times higher conductivity in the concentrated regime (about 3000 mg L$^{-1}$) while also providing the same level of porosity when compared against benchmark RWs with PE binders. This study with ionomer binder RWs deployed NaCl solutions as a representative model to demonstrate the effectiveness of ionomer binder RWs for EDI. These new RWs can be extended in their application as potential spacer channel materials for CDI/MCDI processes as well. The ionomer binder RWs provided a 25% faster separation in bench scale EDI, and they also displayed a modest improvement in the energy efficiency (approximately 5%) when removing 99% NaCl from a 5,000 mg L$^{-1}$ NaCl aqueous solution.

Water-splitting in RWs was assessed in an external experimental setup that is normally used to characterize the quality of bipolar junctions in bipolar membranes. When compared to commercially available bipolar membranes, water-splitting in RWs was substantially less effective because the RWs do not contain a water dissociation catalyst. Overall, two salient points are highlighted: i.) ionomer based RWs offer the potential to reduce both the required capital equipment (e.g., size of EDI stack) and energy consumption for a particular electrochemical separation; and ii.) designing new RWs with effective bipolar junctions via the inclusion of a water dissociation catalyst can facilitate water-splitting and provide more thermodynamically efficient ionic separations in EDI desalination, especially for the ultra-low concentration regime or dilute salt feed concentrations.

FIGS. 1A-1C will now be discussed. FIG. 1A depicts examples of the polymer binder chemical structures that can be used to fabricate the new RW materials. FIG. 1B shows examples of four different configurations and pictures of the ionomer based RWs. Two configurations of the ionomer binder RWs feature a single type of ion-exchange resin particles (e.g., CER only or AER only) bound by an oppositely charged ionomer. These two configurations can maximize the number of bipolar junction points in the RW to improve the rate of water-splitting. This is because the mixed RWs with and without ionomer binder have a smaller probability that fixed cationic groups meet fixed anionic groups separated by a small gap on the nanoscale. It has been reported that, using a simplified electrostatics model, the depletion width for bipolar junction regions is less than 2.5 nm. Hence, gaps between the fixed cationic and anionic groups much larger than 2.5 nm would be ineffective for splitting water. The water-splitting performance of RWs will be discussed in more detail.

An example of the new manufacturing process used to fabricate ionomer binder RWs is depicted in FIG. 1C. The process commences with ionomer solution (14 weight % in N-methyl-2-pyrrolidone (NMP) solvent) mixed with the ion-exchange resin particles and NaCl as a porosigen. This mixture is poured into a stainless-steel mold that is first treated with a non-stick, cooking oil coating and positioned on a level surface in an oven. Then, the NMP solvent is evaporated overnight at 60° C. The mold is closed with a stainless-steel top, and the enclosed mold with the ionomer binder RW is hot-pressed at 125° C. and 2 metric ton load for 2 hours. Then, the ionomer binder RW is removed from the mold and immersed in 250 mL of deionized water to leach the NaCl leaving behind a porous RW. The ionomer binder can be rinsed with copious amounts water to remove residual NaCl and NMP solvent.

Both the AEI and CEI are linear polymers and are soluble in a variety of aprotic solvents including NM P, N,N-dimethylformamide, N,N-dimethylacetamide, and dimethylsulfoxide. Residual solvent present in the ionomer binders after the initial evaporation step makes them thermally processable for adhering the ionomer to the resin particles. However, the ionomer materials are not water soluble, which is an important requirement for use in RW-EDI. Other ionomer material chemistries, such as sodium sulfonate polystyrene and poly(vinyl benzyl pyridinium chloride-random-vinyl benzyl-4-fluorophenyethylamine), were assessed for fabricating ionomer binder RWs, but the mechanical quality of the RWs was poor upon removal from the mold, or the IEC of the ionomer was too high resulting in the RW falling apart in water.

To make mechanically robust ionomer binder RWs, low IEC values of the poly(arylene ether) AEI and CEI (<1.5 mmol g$^{-1}$) were utilized. Typically, these ionomer binder chemistries are closer to 1.5 to 2 mmol g$^{-1}$ when used as membranes and electrode binders in low temperature fuel cells. However, ionomer binders with these levels of IEC values caused unacceptable swelling of the RW when immersed in aqueous solutions.

Figure 2A:
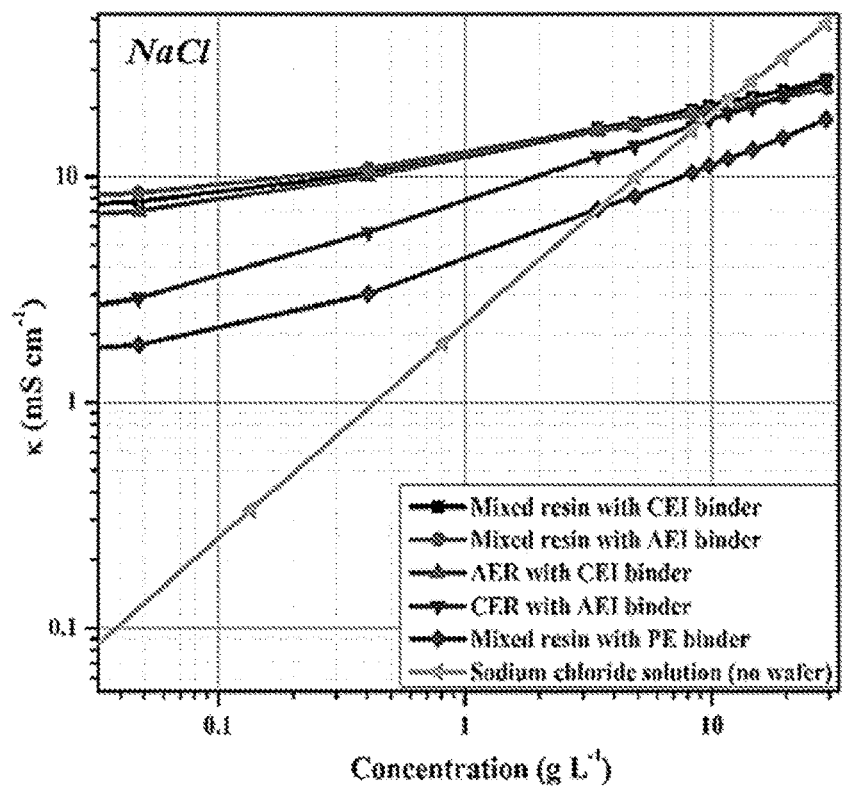
FIGS. 2A and 2B illustrate examples of (A) ionic conductivity ($\kappa$) of resin wafers at different NaCl concentrations; and (B) ionic conductivity normalized to ion-exchange capacity by weight ($\kappa_{wt}^*$) at different salt concentrations, in accordance with various embodiments of the present disclosure.

FIG. 2A illustrates examples of ionic conductivity values of the RWs measured at different salt concentrations. The ionic conductivity was measured in a flow-through mode device that encloses the RW in a cell and allows the salt solution to pass through continuously. Flow-through ionic conductivity measurements were carried out with the different resin-wafer samples using a 2-point measurement cell setup as shown in FIG. 2C. The electrical resistance of the RW was measured across a flow cell enclosing the RW and NaCl aqueous solution using a 4-point LCZ meter. The electrical resistance across the water was continuously monitored with two electrodes during continuous flow until a steady resistance value was achieved. The equation $$\kappa = \frac{t}{A \cdot R}$$

was used to determine the ionic conductivity of the samples under a flow-through setting, where $\kappa$ denotes the ionic conductivity of the wafer, t denotes the thickness, A denotes the surface area, and R is the measured resistance value.

The ionic conductivity for each ionomer binder RW was higher across all salt concentrations when compared to the PE binder RW. Notably, the ionomer binder RWs composed of mixed resin with CEI and AEI binders showed the highest ionic conductivities for NaCl concentrations of ~3-10 g L$^{-1}$ and <3 g L$^{-1}$, respectively. Note that the ionic conductivities of the NaCl solutions are also provided in FIG. 2A. The ionomer binder RW demonstrated that it can augment the spacer channel's ionic conductivity up to 8 g L$^{-1}$ NaCl solutions, while the PE binder RW only improves the ionic conductivity of NaCl solutions up to 3.5 g L$^{-1}$. In other words, at 4 g L$^{-1}$ NaCl solution concentration or greater in the spacer channel, the PE binder RW can no longer boost the ionic conductivity. These results emphasize the ionomer binder RWs' versatility because they can supplement the ionic conductivity in RW-EDI's diluate or concentrate compartments when the solution concentration is high as 8 g L$^{-1}$ NaCl.

Figure 2B:
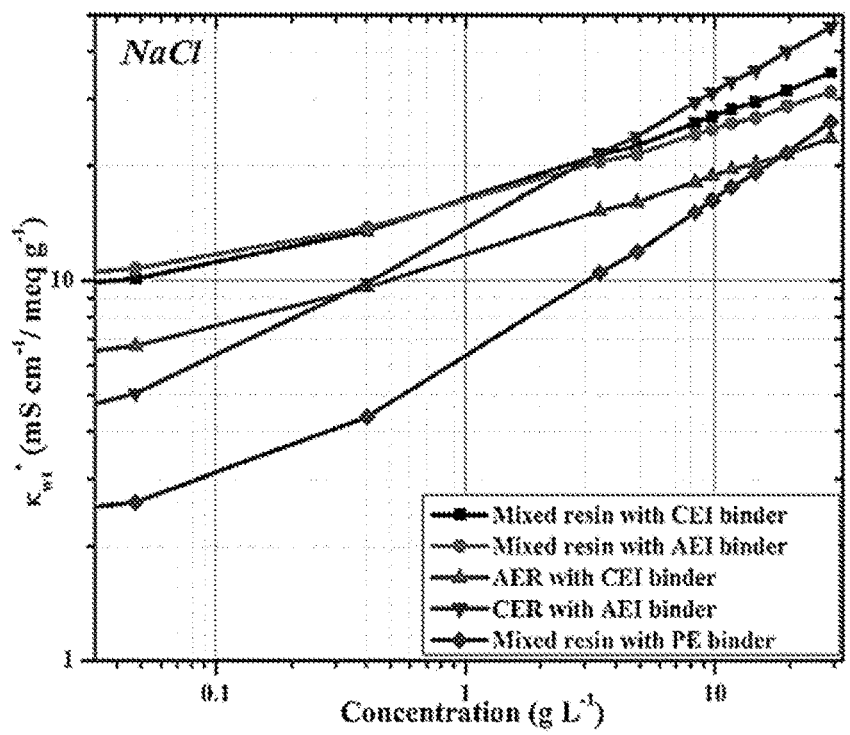
Figure 2C:
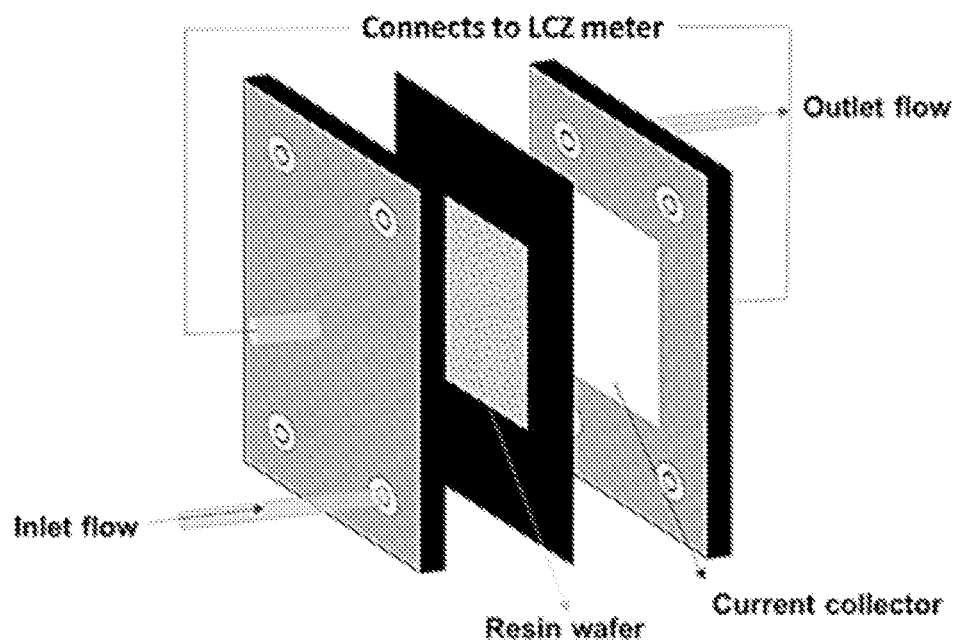
FIG. 2C is a schematic illustrating a setup used to measure the flow-through conductivity of resin wafers, in accordance with various embodiments of the present disclosure.
Figure 2D:
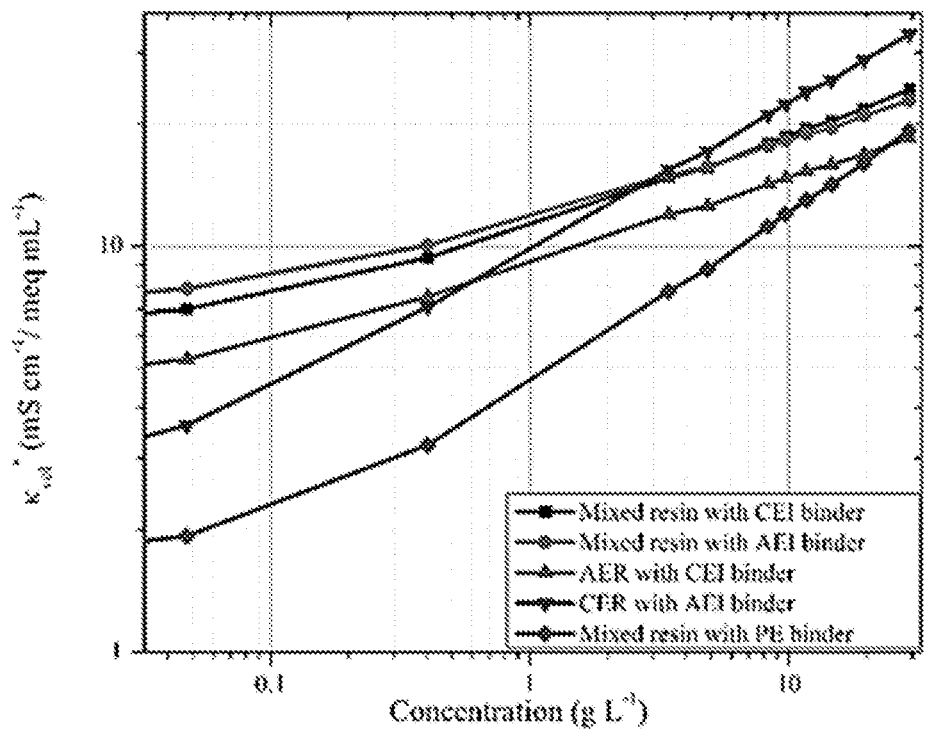
FIG. 2D illustrates an example of ionic conductivity ($\kappa_{vol}^*$) normalized to ion-exchange capacity by volume at different salt concentrations, in accordance with various embodiments of the present disclosure.

FIG. 2B replots the ionic conductivity data normalized by the IEC of the RW on the basis of RW weight (meq g$^{-1}$). FIG. 2D illustrates the ionic conductivity data ($\kappa_{vol}$*) normalized by the IEC of the wafer on the basis of RW volume (meq mL$^{-1}$). Table 1 reports the RWs' IEC values per mass and per volume. The theoretical IECs of the resin wafers were computed by averaging the IEC values of each of the components by weight and volume:

$$IEC \text{ (by weight)} = $$
$$IEC_{CER} \times m_{CER} + IEC_{AER} \times m_{AER} + IEC_{binder} \times m_{binder} \times x_{polymer}$$

$$IEC \text{ (by volume)} = \frac{IEC \text{ (by weight)} \times m_{Total}}{V_{Total} \times (1 - \phi)}$$

where $IEC_{CER}$, $IEC_{AER}$ and $IEC_{binder}$ denote the ion-exchange capacities of the cation-exchange, anion-exchange resins and binder respectively in milliequivalents per gram. $m_{CER}$, $m_{AER}$, $m_{binder}$ and $m_{Total}$ denote the weight of the cation-exchange, anion-exchange resins, binder and total weight of the wafer respectively. $x_{polymer}$ denotes the weight ratio of polymer in the ionomer binder used and $V_{Total}$ denotes the total volume of the wafer which is measured as the product of the wafer area and wafer thickness. $\phi$ denotes the wafer porosity. Salt weight is not considered in these calculations as it is leached out by immersing the wafer in DI water.

These values account for fixed charge carrier contributions from both the binder (if applicable) and the ion-exchange resin particles. The normalized conductivity to IEC shown in FIGS. 2B and 2D yielded similar trends to those shown in FIG. 2A indicating that the ionomer binder RWs' ionic conductivities were higher than the benchmark PE binder RW. Notably, a four-fold increase in normalized ionic conductivity was observed in the dilute salt concentration regime of <0.3 g L$^{-1}$ when compared to PE binder RWs.

TABLE 1

IEC and porosity values of the resin wafers

| Resin wafer type | IEC (meq g$^{-1}$) | IEC (meq mL$^{-1}$) | Porosity (%) |
| --- | --- | --- | --- |
| Mixed resin with PE binder | 0.69 | 0.93 | 26.5 ± 3.8 |
| Mixed resin with CEI binder | 0.77 | 1.11 | 23.8 ± 1.2 |
| Mixed resin with AEI binder | 0.79 | 1.08 | 18.6 ± 3.4 |
| CER with AEI binder | 0.57 | 0.80 | 24.3 ± 0.5 |
| AER with CEI binder | 1.05 | 1.34 | 13.0 ± 1.9 |

The presence of ionic groups in the binder can provide more fixed charge carriers to supplement the ionic conductivity of the RW. The Stefan-Maxwell relationship indicates that ionic conductivity in electrolytes is a linear function of the fixed concentration of charge carriers. Based on the theoretical relationship, the improvement in ionic conductivity may be solely attributed to the addition of fixed charge groups in the ionomer binder. However, the newly formulated RWs require less binder than the benchmark RW with PE binder, and normalizing the ionic conductivity of each RW to the RWs IEC shows the concentration of fixed charge carriers alone cannot account for the increased ionic conductivity of the ionomer based RWs. To better understand the ionic conductivity performance differences of the ionomer binder RWs versus PE binder RWs, electron microscopy was leveraged to inspect the RWs' porous structure and binder distribution.

FIGS. 3A-3E are cross-sectional (left) and surface (right) SEM images of PE binder RW (benchmark) and ionomer binder RWs. The resin beads observed in each micrograph vary from 300 to 500 μm in size. FIG. 3A corresponds to the PE binder RW, and the images show PE enveloping the surface of the ion-exchange resin particles with a relatively thick layer of PE and poor ion-exchange resin particle to ion-exchange resin particle contact. The large surface coverage with a thick PE binder hinders liquid solution contact with the ion-exchange resins, resulting in less ion-exchange and fewer pathways for ion transport from particle to particle. FIGS. 3B-3E show distinctly different distributions of binder and particle confinement within the ionomer binders RWs when compared to the PE binder RW of FIG. 3A. From these images, the ionomer binder in each RW sample is thinner and more evenly distributed to provide better adhesion between the ion-exchange resin particles. Furthermore, the ionomer binder seems to cover particles' surfaces less when compared to the PE binder RW. The ionomer binder RW structures also feature notably large, porous gaps that facilitate bulk liquid flow. The ionomer binder and exposed resin particles are capable of ion-exchange with the liquid solution.

In addition to Table 1 providing the IEC values of the RWs, Table 1 also gives the different RWs' porosity values (i.e., free liquid void space ($V_{FLVS}$) divided by wafer volume, $$P(\%) = \frac{V_{FLVS}}{l \times w \times h} \times 100).$$

Macroporosity of the RWs can be measured using blue dextran (Sigma Aldrich D5751). RWs were fully saturated with Milli-Q water, subject to vacuum filtration, and immersed in 5 g L$^{-1}$ blue dextran. After 5 minutes, the excess blue dextran (free liquid) was removed from the surface by blot drying using a Kimwipe, and each RW was thoroughly rinsed with Milli-Q water. The concentrations of blue dextran in the initial and final rinse solutions were measured by absorbance at 620 nm using UV-Vis and used to calculate the free-liquid-void-space (FLVS) and porosity (P), The FLVS was determined using $$V_{FLVS}(\text{mL}) = \frac{C_{final} \times V_{final}}{C_{initial}},$$

where $C_{initial}$ and $C_{final}$ are the blue dextran concentrations in the initial and rinse solutions, respectively, w is the width of the wafer, l is the length of the wafer, and h is the height of the wafer.

Two of the ionomer binder RWs, the mixed resin with CEI binder and CER with AEI binder, provided comparable porosity values to the benchmark PE binder RW (e.g., 23.8% and 24.3% versus 26.5%). The RWs comprising mixed resin with AEI binder and the AER with CEI binder yielded lower porosity values—18.6% and 13.0%, respectively. RW-EDI demonstrations were carried out with RWs composed of AER with CEI binder and mixed resin with CEI binder (these results are presented in the next section). The RW with AER and CEI binder had the smallest porosity value but still operated effectively in a RW-EDI bench scale unit and with better performance than the benchmark PE binder RW. The RW-EDI with RWs comprising mixed resin with a CEI binder exhibited similar performance to the separation run with RWs of AER with CEI binder. These results suggest that the RWs operate effectively in RW-EDI units with porosity values in the range 13 to 24%.

Electron microscopy and porosity measurements, in conjunction with RW-EDI demonstrations, revealed that the new ionomer binder resin wafers contained macropores and adequate porosity for bulk liquid flow. The first takeaway from these results substantiates the flexibility of the new manufacturing process to produce mechanically intact, conductive, and porous RWs. More importantly, the electron micrographs validate that the ionomer binder acts as a thinner adhesive between ion-exchange resin beads in the RW network when compared to PE binder. As an ion conducting adhesive, the ionomer binder enables facile ion transport from particle to particle in addition to greater uptake of ions from the liquid. These are factors that can govern the effectiveness of the delivery of ions to the membrane surfaces, which results in the ultimate removal of ions from the diluate chamber.

Figure 4A:
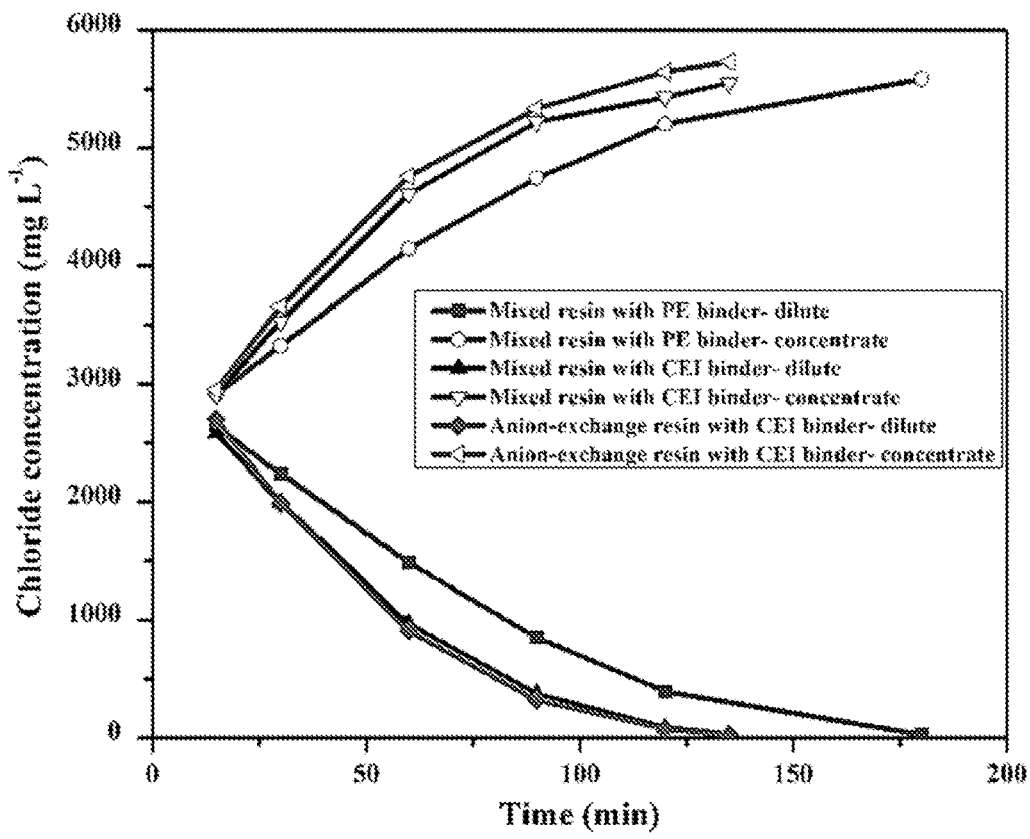
FIGS. 4A-4C illustrate examples of electrodeionization (EDI) performance results characterized using NaCl solutions and different RW materials. The EDI demonstrations were carried out in batch mode under recirculation until 99% of NaCl was removed from the diluate compartment.

The superior ionic conductivity of the ionomer binder RWs, in addition to their adequate porosity, motivated bench-scale RW-EDI studies to remove 99% of a model salt (NaCl, fed at 5,000 mg $L^{-1}$) from solution. The bench-scale unit featured 4 pairs of anion and cation exchange membranes and 4 diluate and concentrate compartments. Thus, the bench-scale EDI unit utilized 4 RWs for each EDI run with the different RW materials. Note that the bench-scale RW-EDI was operated under constant voltage and with recirculation of the diluate and concentrate streams. FIG. 4A illustrates examples of the concentration of $Cl^-$ in the concentrate solution and the diluate solution versus time. The bench-scale RW-EDI unit was run continuously under recirculation until 99% removal of NaCl (measured as $Cl^-$) occurred from the diluate solution. Both ionomer binder RWs, mixed resin with CEI binder and AER with CEI binder, resulted in a 25% faster removal of NaCl from the diluate solution when compared against the RW-EDI run with the benchmark wafer.

Figure 4B:
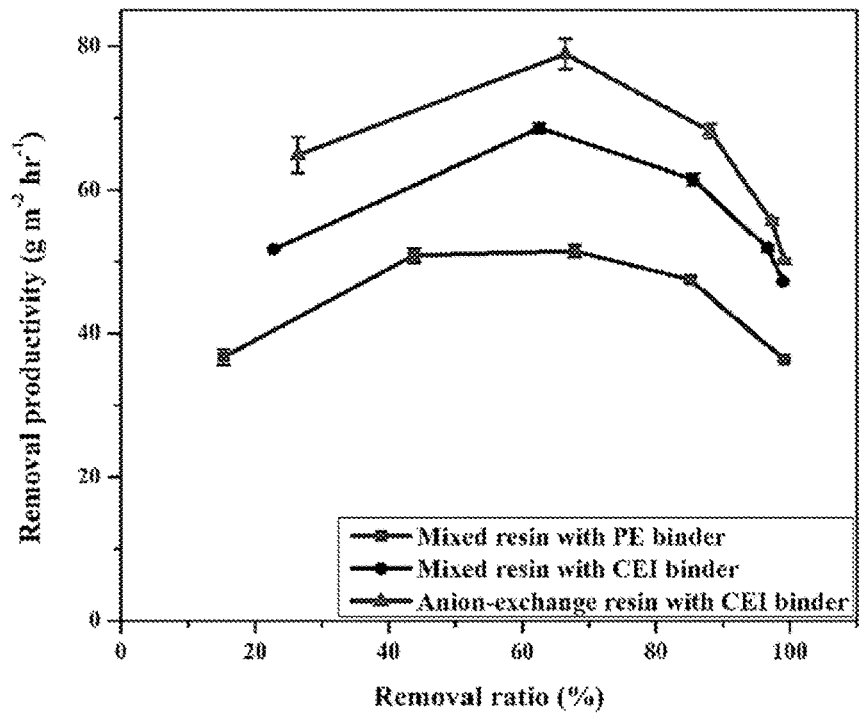

The faster removal of ions from the diluate stream with the ionomer binder resin wafer may be ascribed to the materials' ability to promote a higher rate of ion removal flux over the range of NaCl concentrations in the diluate chamber. FIG. 4B plots the removal productivity (the ion removal flux) from the diluate compartment versus the removal ratio (see equation 1). As the removal ratio increases, the amount of dissolved salt present in the RW decreases resulting in greater ohmic resistance for the dilute chamber. The larger resistance slows down the ion removal flux from the diluate chamber, and thus, the amount of electrical current that can be passed through the RW-EDI stack is lowered. The removal productivity for the ionomer binder RWs as shown in FIG. 4B is nearly 30% higher than the PE binder RW regardless of the removal ratio. The higher removal productivities may be attributed to the ionomer binder RWs' higher ionic conductivities, which are associated with greater ion transport, and improvement of the ion adsorption rate between the aqueous stream and the solid RW.

$$\text{Removal ratio (\%)} = \left(1 - \frac{C_{dilute}}{C_{feed}}\right) \times 100\% \qquad <1>$$

Figure 4C:
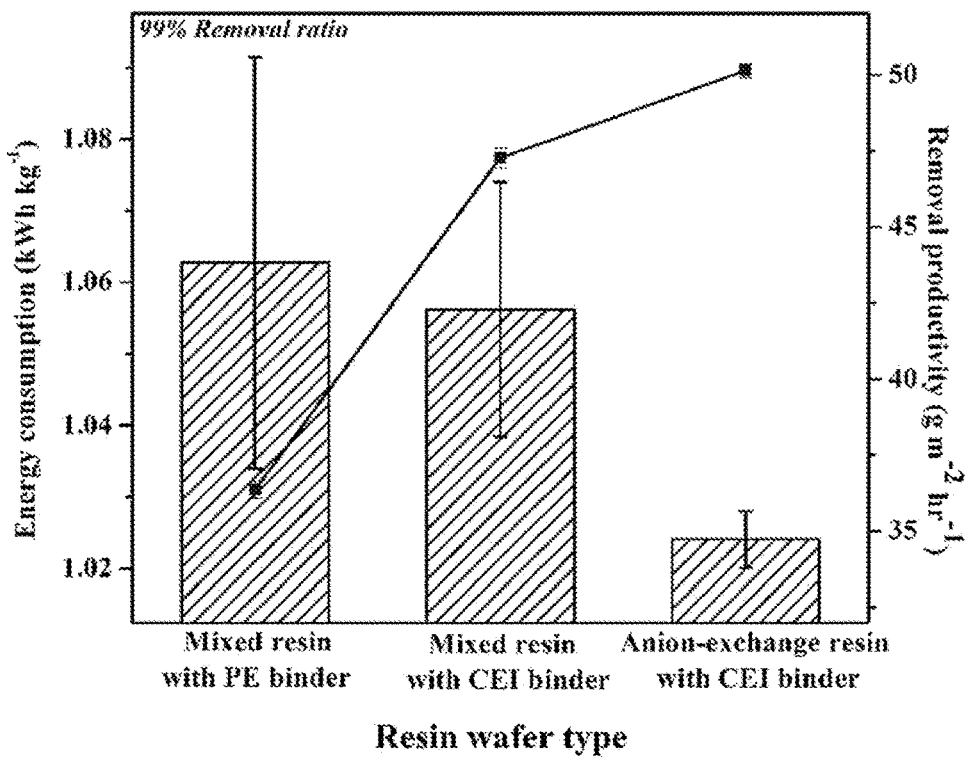

FIG. 4C presents the energy use (kWh) per kg of Cl removed for the RW-EDI runs performed with different RWs along with their respective removal productivities attained at 99% removal. The ionomer RWs provided up to 4.3% reduction in energy consumption during the RW-EDI run in comparison to the benchmark RW. Although the ionomer binder RWs exhibited substantially better ionic conductivity and ion removal rates in RW-EDI, their improvement to energy consumption was marginal but still laudable. The energy consumption could be reduced to a greater extent by operating the RW-EDI unit by modulating the electric field or applying constant current rather than constant voltage. However, a constant current process would yield roughly the same time for clearing 99% of the NaCl from diluate stream (assuming similar charge efficiency values for each EDI run with the different materials). In addition, each RW would likely require different optimal operating conditions for EDI, and in order to provide comparative data, the operation was not optimized in favor of any RW sample. Under optimal operating conditions (e.g., applied electric field, flow rate, etc.), RW-EDI can achieve <0.66 kWh/$m^3$ for 90% removal of 5,000 mg $L^{-1}$ NaCl. The EDI operating parameters may be tuned or optimized to improve or maximize the efficiency of EDI with ionomer RWs. From a process economics viewpoint, energy consumption for RW-EDI is directly related to the operating cost, whereas a RW-EDI unit capable of faster clearance of ions from the dilute solution translates to lower capital costs (due to a smaller unit for deionization) and operational costs (primarily caused by using less ion-exchange membranes and RWs). The results in FIGS. 4A-4C demonstrate that ionomer binder RWs display faster ionic separations, while co-currently using less energy, making them extremely advantageous for RW-EDI processes.

Figure 5A:
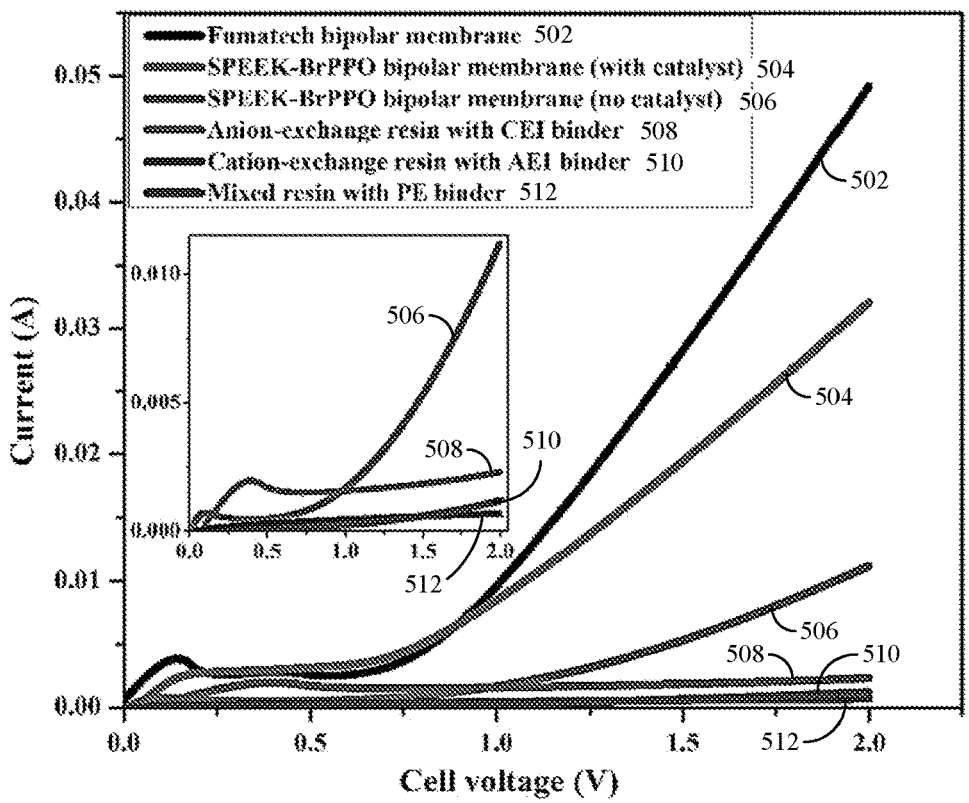
FIG. 5A illustrates examples of current-voltage (I-V) curves of bipolar membranes and RWs tested in a 4-point cell used to assess water-splitting. The bipolar membranes tested include Fumatech (commercially available) and sulfonated poly(arylene ether ether ketone)-quaternary benzyl ammonium poly(2,6-dimethyl 1,4-phenylene) oxide bipolar membrane with and without water dissociation catalysts. RWs evaluated include mixed ion-exchange resins with PE binder (benchmark material), CEI binder with AER, and an AEI binder with CER, in accordance with various embodiments of the present disclosure.
Figure 5B:
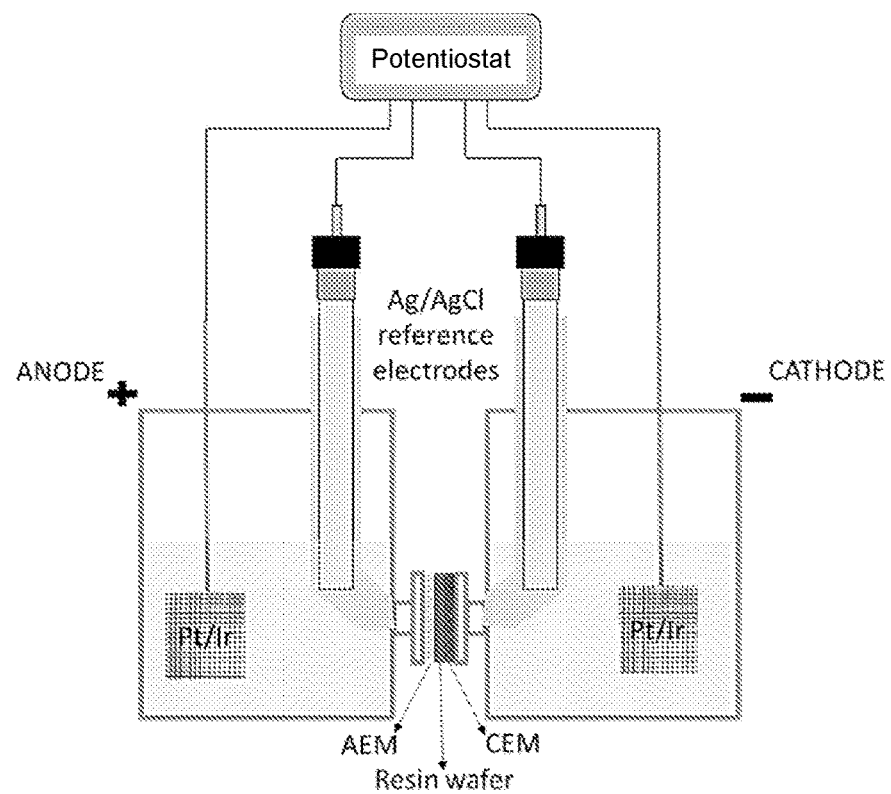
FIGS. 5B and 5C schematically illustrate an example of a two-compartment cell for water splitting experiments and the junction of the cell where a wafer sample is sandwiched between ion-exchange membranes in the four-point bipolar measurement cell, in accordance with various embodiments of the present disclosure.
Figure 5C:
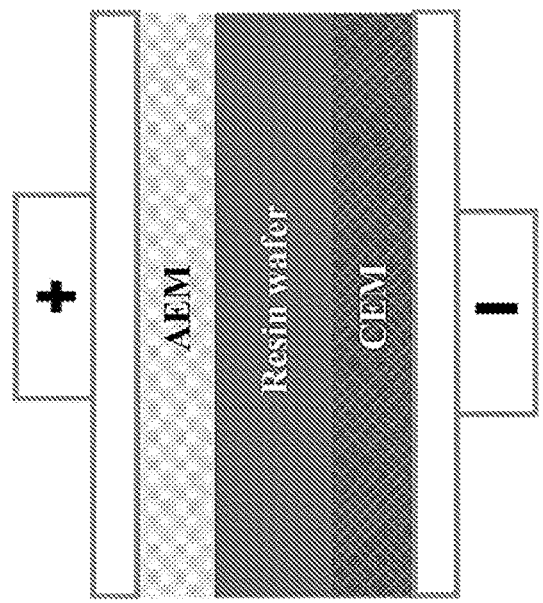

FIG. 5A shows examples of the current-voltage (I-V) response (i.e., polarization curves) of RWs and bipolar membranes in a homemade 4-point cell used to assess water-splitting kinetics in bipolar membranes. The inset in FIG. 5A illustrates the low current response of RW materials 508-512 and a bipolar membrane without a water dissociation catalyst 506. The bipolar membranes were assessed as a control against the RWs, and they include a commercial variant (sourced from Fumatech) 502 and homemade variants with and without water dissociation catalysts 504 and 506. The homemade bipolar membranes comprised a SPEEK cation-exchange membrane (CEM) adjoined to a quaternary benzyl n-methyl pyrrolidinium (cyclic ammonium group) poly(2,6-dimethyl 1,4-phenylene oxide) (QAPPO) anion exchange membrane (AEM). The RW materials assessed include the benchmark material (mixed resin with PE binder) 512, CER with AEI binder 510, and the AER with CEI binder 508. FIGS. 5B and 5C show the experimental setup and configuration of RWs, which was sandwiched between a CEM and an AEM, for testing in the experimental setup. Water splitting in bipolar junction interfaces of the resin wafers and bipolar membranes was assessed using a home-built two compartment, 4-point electrochemical cell setup. The cell comprised two Pt/Ir working electrode meshes, one in each compartment, and Ag/AgCl reference electrodes with Luggin capillaries intimately pressed against the membrane interfaces (in one instance a bipolar membrane and in another instance RW materials). The potential drop was measured across the RW bipolar membrane samples. The active area for the cell was 1.27 cm$^2$, and the concentration of supporting electrolytes in each compartment was aqueous 0.5 M $Na_2SO_4$ electrolyte. Linear sweep voltammetry (LSV) was used to assess the current-voltage relationships of the samples in the 4-point cell. The LSV scan was carried out from 0.0 to 2.0 V at a 5 mV scan rate.

For the Fumatech 502 and SPEEK-QAPPO bipolar membrane with a water dissociation catalyst 504, the on-set potential drop for current flow was observed at 0.8 V indicating relatively facile water dissociation into $H^+$ and $OH^-$ ion carriers in the bipolar junction of the membranes (note: the thermodynamic potential to split water at bipolar junctions is 0.83 V). However, the SPEEK-QAPPO bipolar membrane without water dissociation catalyst 506 and all RWs 508-512 displayed on-set potentials greater than 1 V and substantially lower current responses. These values indicate that the bipolar junctions within these materials have large overpotentials for water dissociation (i.e., poor reaction kinetics) and a smaller population of bipolar junction regions (i.e., fewer sites to dissociate water which is needed for amplifying the current response).

EDI processes can run continuously and without the need for chemicals for ion-exchange bed regeneration because oppositely charged ion-exchange resin particles adjacent to each other and distributed throughout the bed can dissociate water into $H^+$ and $OH^-$ charge carriers. While processing the diluate stream in EDI, very dilute conditions near the exit of the unit favor water dissociation to provide the ionic charge carriers and maintain EDI current flow. Once the $H^+$ and $OH^-$ counterions are formed, a subset of them can exchange onto their oppositely charged resins. The regenerated bed can then remove remaining salt ions from the interstitial solution through ion-exchange or by facilitating ion migration through the ion-exchange membranes (IEMs). The reports for detecting water-splitting in mixed ion-exchange beds for EDI have been sparse, and the evidence for water-splitting has been inferred by monitoring the pH of the effluent stream and current efficiency of EDI under very dilute conditions. For the first time, an external methodology was adopted to assess water-splitting in RW materials. Because the ion-exchange particles are immobilized in RWs, these materials were conducive for assessment in a 4-point cell that is traditionally used for assessing water-splitting in bipolar membranes. It is clear that water-splitting in RWs (AER with CEI binder 508) results in a 20-fold lower current response at 2 V than bipolar membranes with a water dissociation catalyst (Fumatech) 504 and 4-fold lower current response than a bipolar membrane without a water dissociation catalyst (SPEEK-QAPPO bipolar membrane without catalyst) 506 at that same voltage.

The previously described RWs fabricated with ionomer binder should facilitate water-splitting by increasing the population of bipolar junction sites throughout the RW bed. In order to confirm this hypothesis, RWs composed of a CEI binder with only AER 508 and an AEI binder with CER 510 were formulated. The current response for the RW with a CEI binder and AER was marginally better than the mixed RW with PE binder, but it was significantly lower than the response observed with bipolar membranes featuring a water dissociation catalyst. In fact, it was more similar to a bipolar membrane without a water dissociation catalyst. Most water dissociation catalysts for bipolar membranes consist of materials that contain weakly acidic or basic groups (e.g., poly(acrylic acid), graphene oxide, or poly(vinyl pyridine) or metal oxides/hydroxides). Preparation of an ionomer binder RW with $Al(OH)_3$ nanoparticles was attempted based upon previous experience in fabricating bipolar membranes with water dissociation catalysts (e.g., $Al(OH)_3$ nanoparticles). However, this wafer containing 2 wt % of nanoparticles was mechanically brittle. Decreasing the nanoparticle concentration further did not change the water-splitting characteristics of the RWs. The insights attained from the results presented in FIG. 5A promote incorporation of water dissociation catalysts in RWs and to maximize populations of bipolar junctions.

Ionomer binder RWs were developed for EDI as a replacement for benchmark RWs, which are fabricated with a non-conductive PE binder. The ionomer binder RWs displayed superior properties in terms of ionic conductivity (3-5× improvement), while maintaining adequate porosity, resulting in faster removal of ions from aqueous streams with greater energy efficiency in RW-EDI demonstrations. Analysis of conductivity data normalized to IEC, in conjunction with electron micrographs, revealed that the ionomer binder was far more effective as an adhesive between ion-exchange resin particles in comparison to PE binders because it provides a better ion conductive network to deliver ions to IEM surfaces. The water-splitting characteristics of these RWs were assessed in an external setup, and it was determined that all RW materials split water 20× less effectively in comparison to bipolar membranes that contain water dissociation catalysts. Notably, the ionomer binder RWs' ability to split water was on the same order of magnitude to bipolar membranes not featuring a water dissociation catalyst. The develop RW materials with water dissociation catalysts strategically placed in bipolar junction regions of RWs will be examined.

Examples of materials used to prepare samples, details for the ionomer synthesis (including NMR spectra), and resin wafer fabrication for different configurations are presented. Commercially available cation-exchange resins (Purolite, PFC100E (IEC=1.9 eq $L^{-1}$), density=1.27 g cm$^{-3}$) and anion-exchanges resins (Purolite, PFA400 (IEC=1.3 eq $L^{-1}$), density=1.07 g cm$^{-3}$) were used in the resin wafer (RW) preparation. The cation-exchange resins comprised sulfonated sodium polystyrene crosslinked with divinylbenzene. The anion-exchange resins were composed of quaternary benzyl trimethylammonium chloride polystyrene crosslinked with divinylbenzene. The polymer poly(ether ether ketone) (PEEK) was obtained from VICTREX. Udel® polysulfone pellets (PSf) were attained from Acros Organics, and the polymer had an average molecular weight of 60,000 g mol$^{-1}$. Other chemicals such as: 97% sulfuric acid ($H_2SO_4$), sodium chloride (NaCl), 99.8% chloroform ($CH_3Cl$), 95% paraformaldehyde, 98% chlorotrimethylsilane, 99% stannic chloride ($SnCl_4$), 98% N-methyl pyrrolidine, 99% N-methyl pyrrolidone (NMP), 99.96% deuterated dimethylsulfoxide ($d_6$-DMSO), and 99.6% deuterated chloroform ($CDCl_3$), were attained from VWR or Sigma-Aldrich and used as is. Deionized water (DI $H_2O$, 18.2 MΩ, <20 ppb TOC) was produced at the time of a particular synthesis or experiment with a Milli-Q Millipore Elix 10. Commercially available cation, anion, and bipolar membranes were used for the RW-EDI stack measurements and were obtained from Ameridia (Neosepta CMX, AMX, and BP; ASTOM Corporation, Tokyo, Japan).

Poly(arylene ether) ionomer synthesis procedures. SPEEK ionomer binder: PEEK was sulfonated. PEEK was dissolved in concentrated sulfuric acid ($H_2SO_4$) at room temperature. The degree of sulfonation (DS) in PEEK was monitored by assaying the reactor periodically throughout the reaction. After an aliquot was removed from the reactor, the sample was precipitated in DI $H_2O$ and rinsed excessively in DI $H_2O$. After drying in a fume hood, the sample was dissolved in d6-DMSO and analyzed via $^1H$ NMR. This procedure was repeated two or three times until the desired DS value of SPEEK was obtained. After the desired DS value was achieved, the remainder of the SPEEK in sulfuric acid batch was precipitated in excess DI $H_2O$ and rinsed excessively with DI $H_2O$ to neutralize excess $H_2SO_4$. The precipitated solid was collected by filtration and then dried in a fume hood overnight followed by vacuum drying at room temperature for 3 hours. A DS of 0.4 was found suitable for making conductive but mechanically robust RWs. Too high of a DS value (i.e., >0.5) resulted in excess swelling of the RW. The ionomer solution used to prepare the resin wafer was prepared by dissolving SPEEK in NMP to make a 14 wt % solution.

QAPSf ionomer: Udel® PSF was chloromethylated. Udel® PSF was dissolved in $CHCl_3$ at room temperature to prepare a 2 wt % solution in a round bottom flask with equipped with a magnetic stir bar. Paraformaldehyde and chlorotrimethylsilane (5:5:1 molar ratio to PSf repeat unit) was added to the flask. The flask was sealed with a rubber septum and the silicon oil bath containing the flask was heated to 55° C. Then, $SnCl_4$ (Lewis acid catalyst), a 2 wt % ratio to PSf added, was added slowly by syringe through the rubber septum. To monitor the degree of chloromethylation (DC) of PSf, samples were assayed from the flask over time. After withdrawing an aliquot from the flask, the chloromethylated polysulfone (CMPSf) solution was precipitated in methanol (5:1 volume ratio) and then vacuum filtered. The degree of chloromethylation (DC) of the batch obtained was 0.88. Any CMPSf batch used above 0.9 DF yielded a QAPSf material that resulted in a swollen resin wafer with poor mechanical integrity.

To prepare the QAPSf solution used to make RWs, chloromethylated polysulfone in (NMP) was dissolved in NMP to make a 14 wt % solution. 1-methyl pyrrolidine was then added to the solution in the ratio of 2:1 to the amount of chloromethyl groups per repeat unit in CMPSf. The conversion of chloromethyl groups to quaternary benzyl N-methylpyrrolidinium chloride groups was carried out for 24 hours at 60° C. The ionomer solution was then cooled to room temperature and stored until use in the manufacture of the RW.

Conventional resin wafer (RW) synthesis. Synthesis of the conventional RW (i.e., Argonne's benchmark material) was done by the addition of cation-exchange resins and anion-exchange resins in the ratio 1:1.3, to which polyethylene binder and sodium chloride were added to yield a mix ratio by mass of 2.0:1.0:0.5 of resins to binder to salt. The resulting mixture was packed to a resin mold. The typical dimensions of the mold for this work was 14 cm×14 cm×0.3 cm (other mold dimensions are possible). The mold was hot pressed around 100-115° C. and with 2 metric tonnes of force for 30 minutes.

RW with cation-exchange ionomer (CEI) binder. A resin mixture was prepared by adding cation-exchange resins and anion-exchange resins in the ratio of about 1:1.3 and a range of about 10 wt % to about 14 wt % of solution of SPEEK in NMP and sodium chloride in the mass ratio of 2.4:2:1 of resins to binder to salt. The resulting mixture was packed into a mold and dried in the oven at 60° C. for 12 hours to remove residual solvent. It is then hot pressed at 125° C. for 1.5 hours with 2 metric tonnes of force. The same procedure was followed for the resin-wafer comprising anion-exchange resin particles only with the CEI binder. Here, the mixture was prepared in the ratio of 2.4:2:1 of resins particles to CEI binder to salt.

RW with anion-exchange ionomer (AEI) binder. A resin mixture was prepared by adding cation-exchange resins and anion-exchange resins in the ratio 1:1.3 and 10 wt % to 14 wt % solution of QAPSf in NMP and sodium chloride in the mass ratio of 2.4:2:1 of resins to binder to salt. The resulting mixture was packed into a mold and dried in the oven at 60° C. for 12 hours to remove residual solvent. It was then hot pressed at 150° C. for 1.5 hours at 2 metric tonnes. The same procedure was followed for the resin-wafer only featuring cation-exchange resin particles with the AEI binder. This mixture is prepared with the ratio of 2.4:2:1 of resin particles to AEI binder to salt.

Promoting Water-Splitting in Janus Bipolar Ion-Exchange Resin Wafers

Separation processes are integral operations to chemical and industrial plants, and they play a prominent role in the economics and quality of products for chemical, pharmaceutical, food, and biotechnological applications. On average, 40% of operation costs and 40% of capital costs for chemical plants are attributed to separation processes, and a 2019 United States National Academy Report highlighted that 10 to 15% of all U.S. energy production is consumed by separation processes. Conventional separation methods including distillation and evaporation require a phase change and are energy intensive. The corresponding economic costs and environmental concerns about fossil-fuel emissions are driving the research and development of more energy-efficient and cost-effective separation processes and technologies. At the forefront of more efficient, modular, and selective separations, are molecularly engineered material deployed in membrane-based and adsorbent-based separations. Undoubtedly, new materials and maturation of emerging separation platforms that are less energy intensive will be at the forefront of future separations technologies.

A sub-subset of separations relates to electrochemical systems that are effective for removing ionic species from aqueous and non-aqueous liquids. Such processes are used in industrial wastewater remediation and deionization. Electrochemical systems for ionic species removal from liquid streams include well-established platforms such as electrodialysis (ED) and electrodeionization (EDI) and emerging ones such as membrane capacitive deionization/capacitive deionization (MCDI/CDI) and shock electrodialysis. Electrochemical separations have also been used for purifying gases through electro-swing reactive and RW-EDI gas adsorption.

A key component for realizing high energy efficiency and high performance in EDI is minimizing sources of resistance through adjustment of the system's operating parameters and implementation of new materials. For example, system parameters (e.g., cell voltage and feed concentration flow rate) can be optimized for RW-EDI to make it more energy efficient than reverse-osmosis (RO) for brackish water treatment (2,000 ppm of total dissolved solids (TDS) to 5,000 ppm of TDS in the feed concentration). As a materials example, reducing the ion-exchange membrane (IEM) materials' area-specific resistance (ASR) by a factor of 5 to 10 can result in a 50% reduction in energy consumption for desalination at low TDS concentrations (e.g., 250 ppm to 540 ppm). Hence, both materials innovation and systems level engineering enhanced energy efficiency for electrochemical separations.

A uniquely defining phenomenon in the EDI process is the regeneration of the ion-exchange resin beads during deionization through water-splitting. Unlike ion-exchange chromatography, EDI can be implemented as a continuous ion-exchange process because water-splitting, which results in the formation of hydroxide ($OH^-$) ions and protons ($H^+$), occurs in the ion-exchange resin bed. These ions can exchange back into the anion exchange and cation exchange resin (AER and CER) particles, respectively, recombine to form water, or migrate out of the diluate chamber via the anion exchange and cation exchange membranes (AEMs and CEMs). Hence, the water-splitting phenomenon allows for continuous ion-exchange and removal of charged species from the liquid feed stream. Ion-exchange chromatography, on the other hand, requires acid and base chemicals for regenerating the ion-exchange resin particles in the column. The use of these chemicals leads to undesirable waste, downtime for the regeneration/cleaning process, and higher capital costs because multiple columns need to be installed in parallel to ensure a continuous process.

Figure 6A:
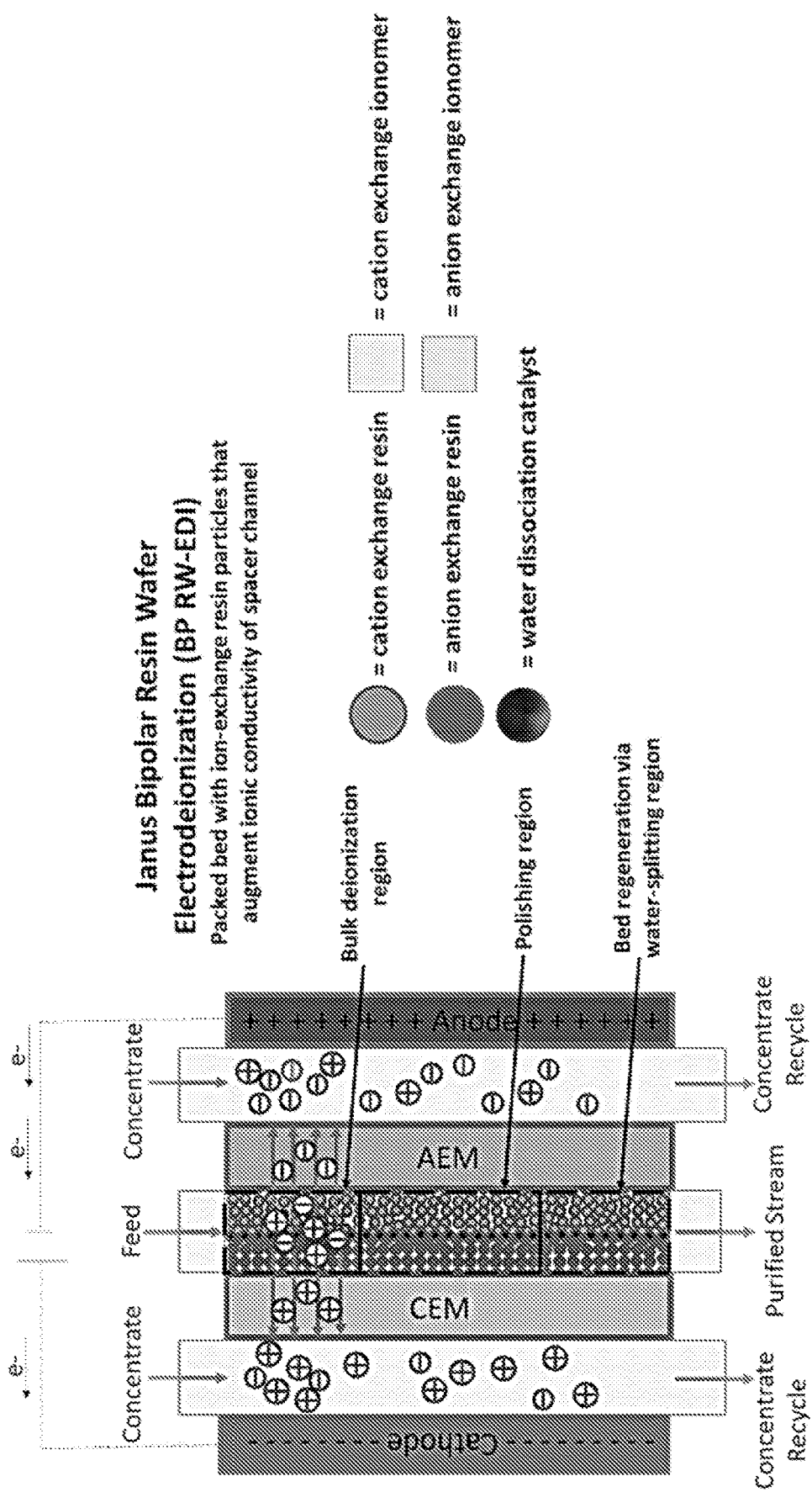
FIGS. 6A and 6B illustrate examples of: (A) a simplified Janus bipolar resin wafer (BP-RW) EDI process that has the bulk of deionization occurring at the inlet of the diluate chamber, followed by ion polishing in the middle of the chamber, and then water-splitting near the middle to the end of the diluate chamber to sustain current flow and to regenerate the ion-exchange resin particles; and (B) water dissociation pathway on a metal hydroxide surface (i.e., water dissociation catalyst) imbedded in an asymmetric Janus BP-RW, in accordance with various embodiments of the present disclosure.

Water-splitting in EDI has been well-documented; however, it has been primarily discerned by monitoring the pH changes of the effluent streams. In a continuous EDI process (see FIG. 6A), the ions in the aqueous solution are adsorbed via ion-exchange onto the resin beads. These adsorbed ions can then be successively desorbed from the adsorption sites by two parallel phenomena: i.) electrically driven migration and ii.) resin bead regeneration caused by $H^+$ and $OH^-$ ions that are generated from water-splitting. More specifically, the desorbed salt ions exchanged by the $OH^-$ and $H^+$ ions electro-migrate into the concentrate compartment, which is separated by the ion-exchange membranes. At steady-state, there is constant concentration profile along the direction of feed flow for ions adsorbed on the ion-exchange resin beads to the ion-exchange membrane surfaces. In a continuous EDI process, the bulk of deionization occurs at the entrance to the middle region of the unit. As the concentration of mobile ions in the diluate stream decreases, the ion-exchange bed augments the diluate stream conductivity. Finally, water-splitting at the middle to the end of the chamber regenerates the ion-exchange resin particles and provides ions to enable electrical current flow through the EDI unit despite the majority of salt ions already being removed.

Figure 6B:
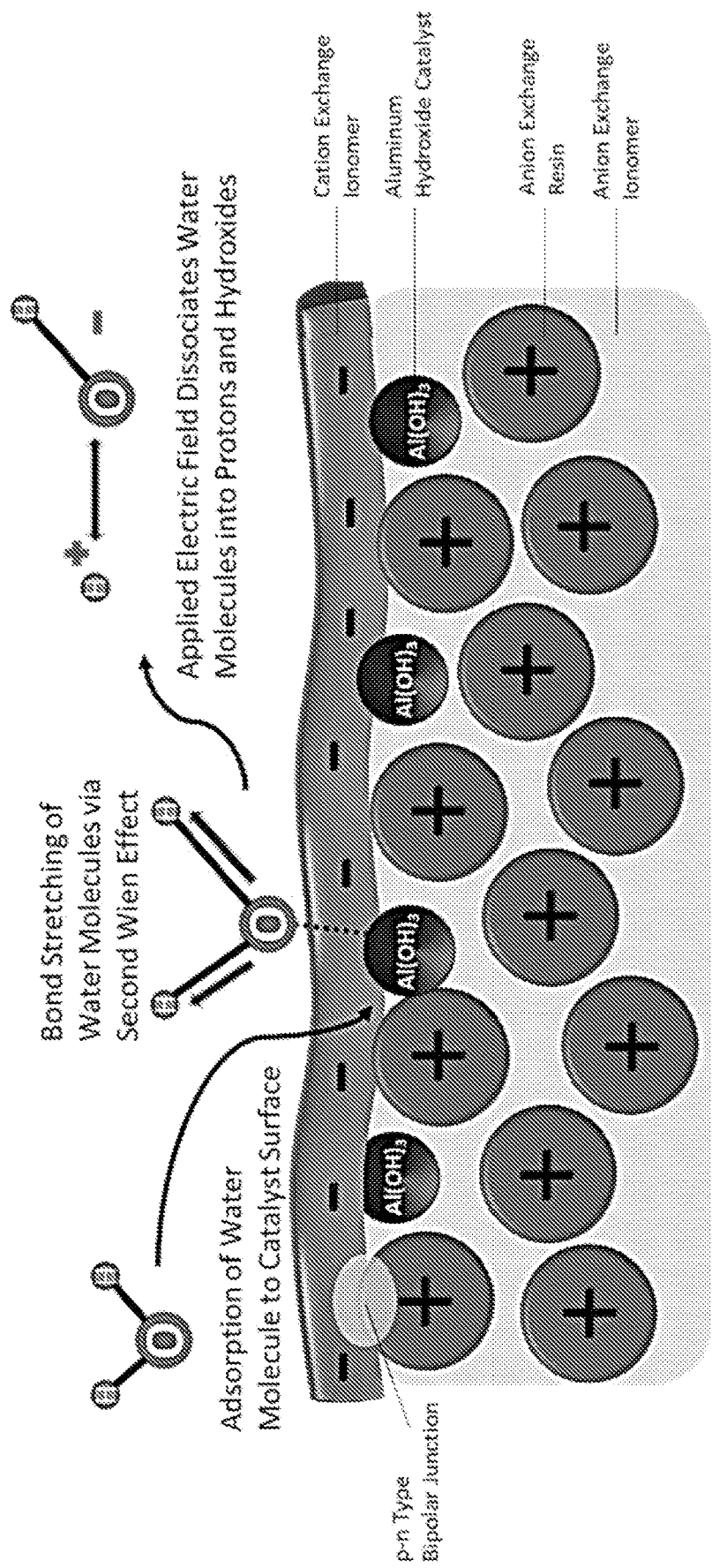

The water-splitting phenomenon in EDI occurs at the interface of CER and AER particles that are in intimate contact and form a p-n type abrupt junction. This junction of interfaced polycations and polyanions is designated as the bipolar junction (highlighted in FIG. 6B). Applying an external electric field gradient across the bipolar junction interface leads to water-splitting. Note that the depletion width for bipolar junction interfaces is a few nanometers. Therefore, large distances between the oppositely charged particles hinders water-splitting in the ion-exchange resin beds of EDI. Further, a small population of bipolar junctions in the ion-exchange resin particle bed minimizes the water-splitting effect leading to poor regeneration of ion-exchange resin particles. Conversely, increasing the number of bipolar junctions within the resin wafer accelerates proton and hydroxide formation. Regardless of the electrochemical separation process, the water-splitting generated in the resin bed can be exploited to achieve a desired pH adjustment of the process stream (e.g., during deionization, electrocoagulation of metals and silica, gas capture, and mineral acid and base production). For example, the maintenance of an alkaline solution can ensure that organic acids remain in ionized form for separation based upon anion exchange; this is important for carbon valorization and purifying bio-fuels. BPM electrodialysis has been the most common method for electrochemical pH adjustment of process streams, but this method necessitates fairly concentrated streams of TDS to overcome spacer channel ohmic resistances to electrochemically transport the ions.

Electrochemical separation processes are undergoing a renaissance as the range of applications continues to expand because they offer opportunities for increased energy efficiency and sustainability in comparison to conventional separation technologies. Existing platforms such as electrodialysis and EDI are seeing significant improvement and are currently being deployed for treating a diverse set of liquid streams (e.g., water and wastewater treatment, organic acid separation, etc.). In addition, the relatively low inherent electricity requirement for electrochemical separations could potentially be satisfied through integration with sustainable sources of renewable energy. In order to achieve a truly sustainable electrochemical separations process, it is paramount to improve the energy efficiency of electrochemical separations by minimizing all sources of resistances within these units. This disclosure presents a new class of symmetric and asymmetric Janus bipolar resin wafers (RWs) that augment the spacer channel ionic conductivity in EDI while having the additional functionality of splitting water into protons and hydroxide ions. The latter attribute is important in niche applications that require pH modulation such as silica and organic acid removal from liquid streams. The Janus BP-RWs were devised from single ion-conducting RWs that were interfaced together to create an intimate polycation-polyanion junction. Interestingly, the conductivity of the single ion conducting RWs at low salt concentrations was observed to be dependent on the ionic mobilities of the counterions that the RW was transferring. Using single ion-conducting RWs to construct Janus BP-RWs enabled the incorporation of a water-splitting catalyst (aluminum hydroxide nanoparticles) into the porous ion-exchange resin bed. It is believed that this is the first time a water dissociation catalyst has been implemented in the ion-exchange resin bed for EDI. The water dissociation catalyst in bipolar junctions pre-polarizes water making it easier to split it into hydronium and hydroxide ion charger carriers under applied electric fields via the Second Wien effect. The new molecularly layered Janus RWs demonstrate both satisfactory water-splitting and salt removal in bench scale EDI setups and these materials may improve, or even supplant, existing bipolar membrane electrodialysis units that currently necessitate large electrolyte feed concentrations.

This disclosure demonstrates the incorporation of a water dissociation catalyst into ion-exchange RWs for promoting water-splitting in RW-EDI. Water dissociation catalysts, which are found in bipolar membranes, facilitate water-splitting via the Second Wien Effect (depicted in FIG. 6B). The catalyst in the bipolar junction pre-polarizes water to severe its HO—H bond. The catalyst can dampen the strength of the electric field in the bipolar junction region for splitting water, but this undesired attribute is overshadowed by the importance of the catalyst that promotes water-splitting kinetics by several orders of magnitude—when compared to a bipolar junction with no catalyst. A previous attempt to incorporate a water dissociation catalyst into immobilized ion-exchange RW used in EDI was unsuccessful as incorporation of the aluminum hydroxide (Al(OH)$_3$) nanoparticles, a water dissociation catalyst, compromised the mechanical integrity of the RW. To overcome this challenge, a layered manufacturing approach was adopted by 1) preparing a single ion-conducting RW, 2) depositing of Al(OH)$_3$, and 3) adjoining oppositely charged, single ion-conducting RW or a thin layer of oppositely charged ionomer film. These designs are termed symmetric Janus BP-RW and asymmetric film Janus BP-RW, respectively.

Prior to investigating the water-splitting behavior of the Janus BP-RWs, the ionic conductivity of the single ion-conducting RWs were studied. Both single ion-conducting RWs featured an ionomer binder, and these wafers showed superior ionic conductivity over the RW that consisted of mixed AER and CER and a PE binder (i.e., the benchmark material used at Argonne National Laboratory). The anion exchange ionomer (AEI) binder with AER RW (AEI-AER RW) displayed the highest ionic conductivity to date of all RW materials reported in the literature (17±0.3 mS cm$^{-1}$ at 0.1 g L$^{-1}$ in NaCl to 58±3.6 mS cm$^{-1}$ at 29 g L$^{-1}$). Interestingly, the cation exchange ionomer binder with CER RW (CEI-CER RW) exhibited lower ionic conductivity in comparison to the AEI-AER RW. Furthermore, addition of CER to AEI binder RW (AEI-CER RW) also resulted in lower ionic conductivity in comparison to the AEI-AER RW. These observations can primarily be attributed to the lower ionic mobility of the Na$^+$ counterion in the CER when compared to the Cl$^-$ counterion in the AER. Hence, the ionic conductivity is largely influenced by both the ion-exchange resins and the ionomer binder.

With the newly prepared single ion-conducting RWs, the water-splitting behavior of the RWs with and without a water dissociation catalyst and different configurations (e.g., symmetric and asymmetric) were studied. The incorporation of a water dissociation catalyst improved water splitting by factor of 2x-4x while providing a similar level of ionic conductivity and porosity in comparison to the RWs without the catalyst. The Janus BP-RW with a water dissociation catalyst caused significant pH shifts in the diluate and concentrate compartments of EDI that are similar to what is observed in bipolar membrane electrodialysis. The Janus BP-RW is an alternative material for pH adjustment of the concentrate and diluate streams in EDI rather than using a BPM. Notably, it can have tailored molecular interfaces located at different junctions across the wafer thickness for modulating pH adjustment of streams to different values.

Manufacturing of Single Ion-Conducting RWs

Figure 7A:
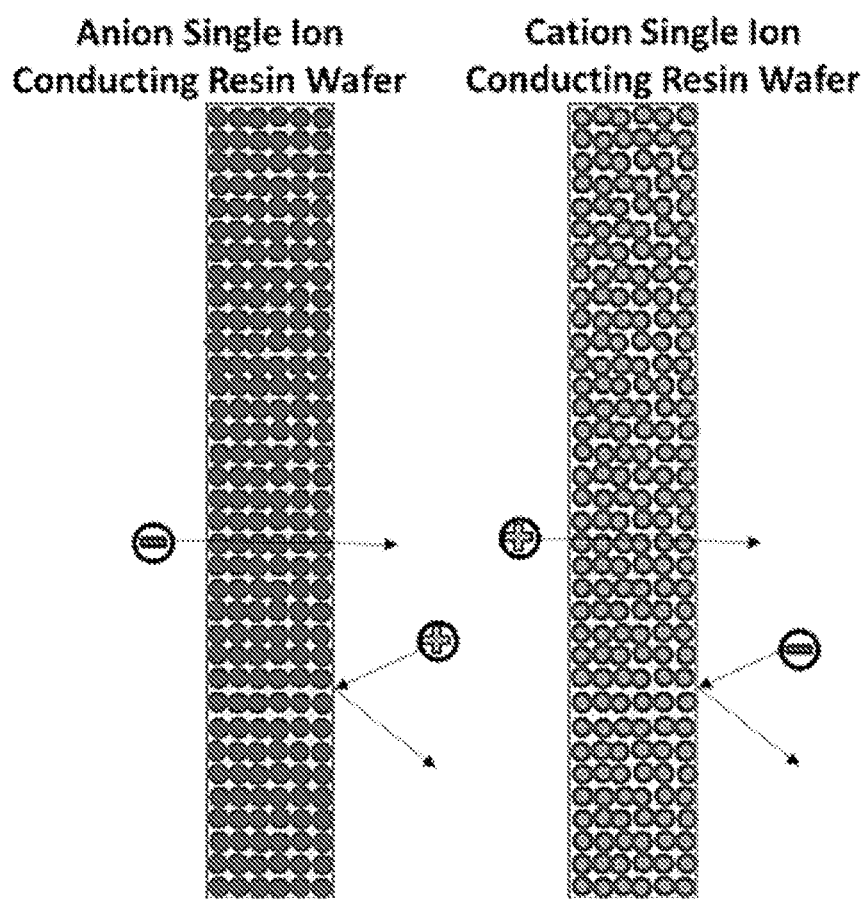
FIGS. 7A and 7B illustrate examples of: (A) single ion-conducting RWs; and (B) a manufacturing scheme for single anion- and single cation-conducting RWs, in accordance with various embodiments of the present disclosure.

FIG. 7A illustrates an example of a design of single ion-conducting RWs that solely feature anion exchange or cation exchange material. The anion conducting RWs were constructed with AERs and an AEI binder (quaternary benzyl n-methyl pyrrolidinium chloride poly(arylene ether sulfone) (QAPSF)) while the cation conducting RWs were constructed with CER and a CEI binder (sodium sulfonate poly(ether ether ketone) (SPEEK)). Pairing a similar charged ion-exchange resin and polymer electrolyte binders results in RW material that facilitates passage of the counterion while minimizing co-ion transport due to Donnan exclusion.

Figure 7B:
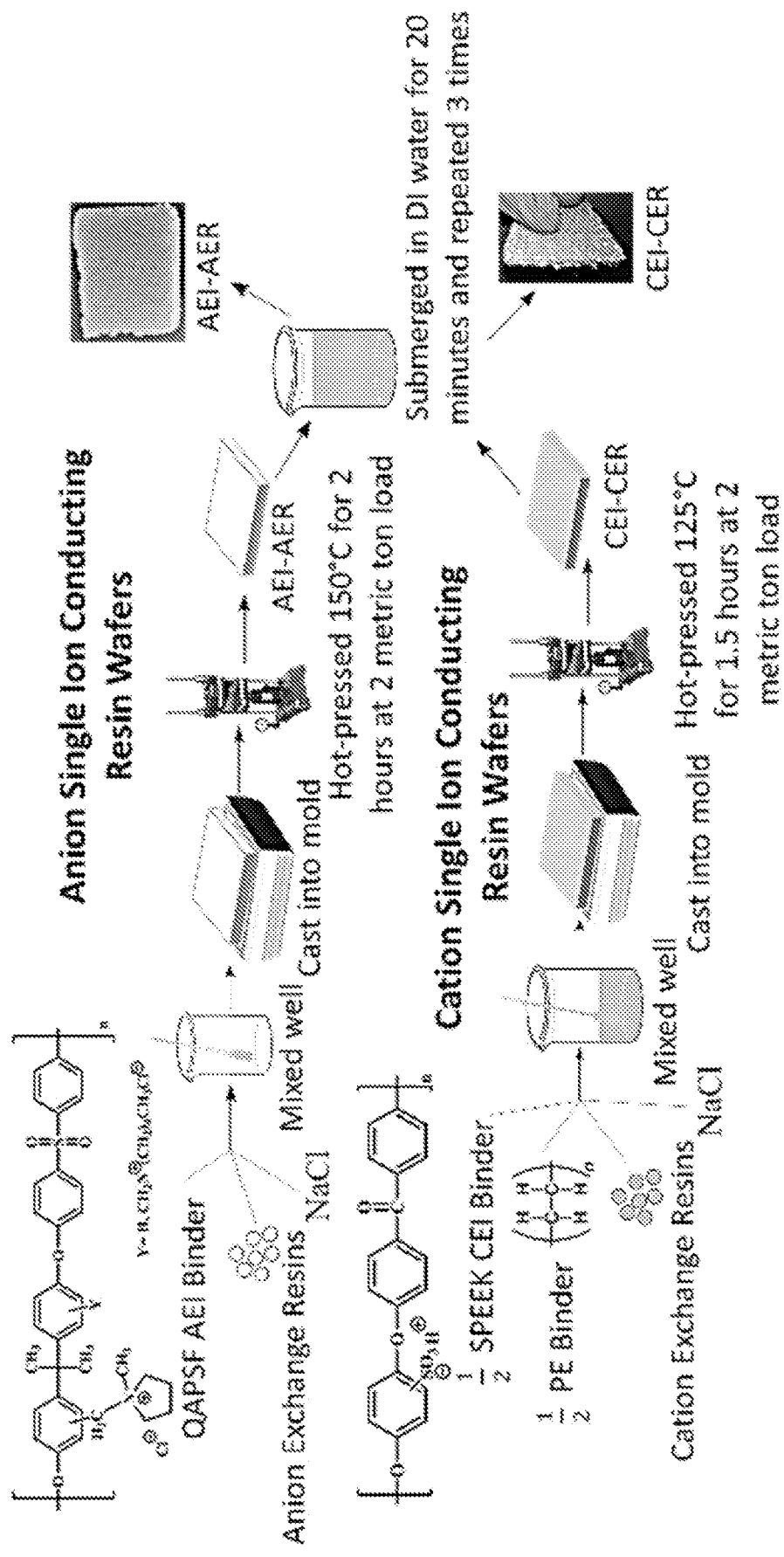

FIG. 7B illustrates an example of the manufacturing process of the single ion-conducting RWs. AEI and CEI binders were prepared as described elsewhere. The IEC values of the RWs are presented in Table 2 (see below). AERs and CERs are vacuum dried at room temperature for 30 minutes prior to use to remove moisture. The ionomer is dissolved to form a 14 wt % concentration in n-methyl-2-pyrrolidone (NMP) solvent. The ionomer solution is mixed with the ion-exchange resins and sodium chloride (a sacrificial porosigen) in a 2:2.4:1 ratio and then cast into a foil-lined stainless-steel mold. The mold is dried in an oven at 60° C. for 12 hours to remove residual solvent and then hot pressed at 2 metric ton load for 125° C. for 1.5 hours for the CEI-CER or 150° C. for 2 hours for the AEI-AER. The RWs are cooled under the 2-metric ton load before removing from the molds and then immersed in DI water three times for 20 minutes to dissolve the porosigen (i.e., NaCl).

As previously discussed, SPEEK based CEI binder produced mechanically stable RWs with a CER-AER mixture and AER only. However, the CEI binder with the CER only resulted in a mechanically fragile RW indicating that binder and ion-exchange resin compatibility are important properties for making robust RWs. Previous work showed that quality RWs could not be produced from perfluorosulfonic acid binders (e.g., Nafion®), and sulfonated polystyrene binders, suggesting that it was necessary to modify the manufacturing procedure for the CER RW by blending PE binder with the SPEEK ionomer solution (1:1 mass ratio). This manufacturing procedure produced a robust, free-standing cation-exchange RW shown in FIG. 7B.

Ionic Conductivity and Material Properties of Single Ion-Conducting RWs

Figure 8A:
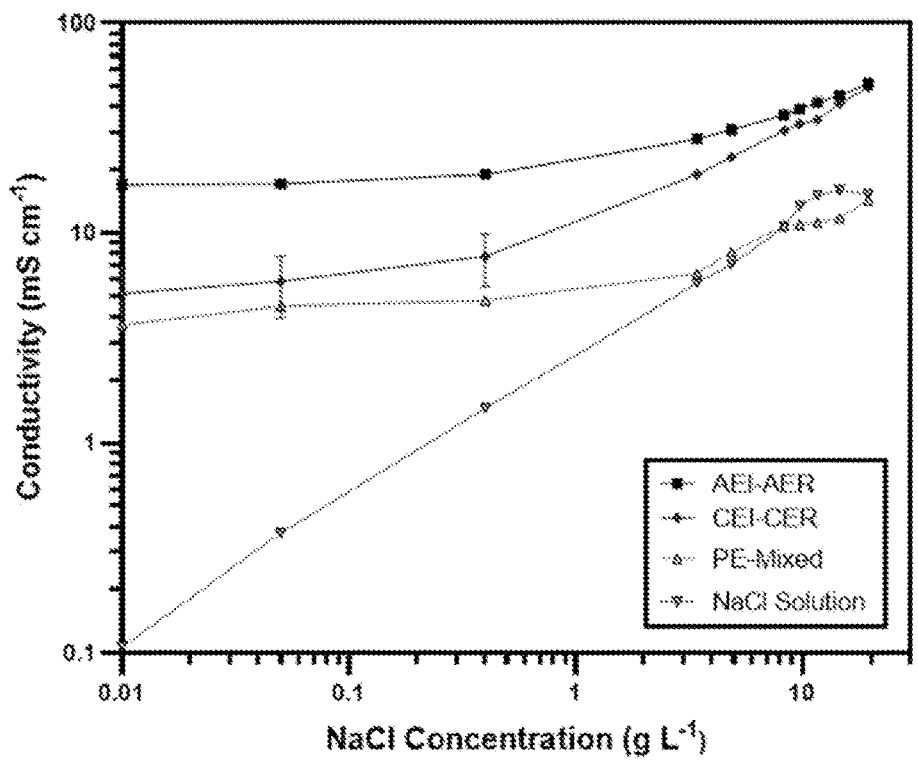
FIGS. 8A and 8B illustrate examples of: (A) ionic conductivity of single ion-conducting RWs at various NaCl concentrations; and (B) ionic conductivity normalized to ion-exchange capacity at various NaCl concentrations, in accordance with various embodiments of the present disclosure. Error bars in these plots represent the absolute difference (n=2) from the average for the ionomer RWs.

The ionic conductivity values of the single ion-conducting RWs were measured in a two-point static conductivity cell at various NaCl concentrations (FIG. 8A). The single ion-conducting RWs were benchmarked against the conventional mixed RW with PE binder and NaCl solution conductivities. Duplicate measurements were performed for the ionomer RWs, and the error bars in FIG. 8A represent the absolute difference between the mean of both measurements. Both of the single ion-conducting RWs exhibited higher conductivities than the benchmark RW that featured mixed AER and CER with PE binder. Porosity measurements (Table 2) indicated that the single ion-conducting RWs were as porous as the benchmark RW that has been used in numerous EDI demonstrations.

The AEI-AER RW displayed higher ionic conductivity in comparison to CEI-CER RWs and mixed RWs featuring either AER or CER due to a higher ionic mobility for Cl$^-$ over Na$^+$ in dilute water streams (7.91×10$^{-4}$ cm$^2$ s$^{-1}$V$^{-1}$ for Cl$^-$ and 5.194×10$^{-4}$ cm$^2$ s$^{-1}$V$^{-1}$ for Na$^+$—i.e., about 50% higher for chloride). Ionic mobility represents the migration rate of an ion in the presence of an applied electric field, and it is proportional to the diffusion coefficient normalized to the thermal energy of the system.

Figure 8B:
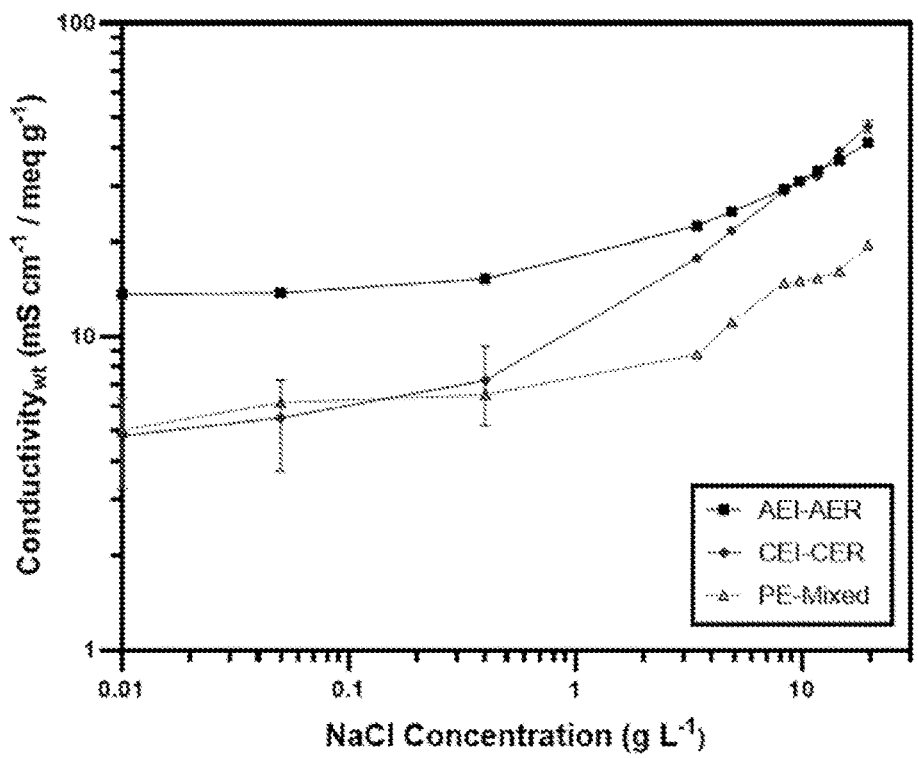

FIG. 8B presents the ionic conductivity of the RW samples normalized to their IEC values. Ionic conductivity is linearly dependent on the concentration of fixed charger carriers in the ion-exchange material. Thus, a material with a higher IEC would result in higher ionic conductivity. The AEI-AER still displayed the highest ionic conductivity when normalized to IEC at low NaCl concentrations. The ionic conductivity for single ion-conducting RWs is attributed to two factors: i) counterion migration along the polymer in the ion-exchange resin and ionomer binder and ii) ionic migration of the supporting electrolyte (i.e., NaCl) dissolved in the RW sample. By normalizing the ionic conductivity to the IEC, it is clear that the AEI-AER displays greater ionic conductivity because the counterion, Cl$^-$, has a higher ionic mobility than Na$^+$.

In the context of most electrochemical separation platforms, deionization occurs by transport of anions and cations across an AEM or CEM, respectively. The rate of ion removal is dependent upon the rate of delivery of ions to these interfaces, and thus, the ionic mobility values in the aqueous phase and ion-exchange resin bed are important descriptors for EDI transport. Because of iso-neutrality constraints, the ratio of cations to anions (assuming both have the same valence number) must be equivalent in the diluate and concentrate chambers. Hence, the rate of both anion and cation removal from the diluate chamber is limited by the slowest moving ion.

TABLE 2

Ion exchange capacity (IEC) and porosity of RWs

| Resin wafer type | IEC (meq g$^{-1}$) | IEC (meq mL$^{-1}$) | Porosity (%) |
|---|---|---|---|
| CEI-CER | 1.07 | 1.00 | 13.5 ± 1.6 |
| AEI-AER | 1.25 | 0.99 | 16.6 ± 1.5 |
| AEI-Mixed | 1.36 | 0.96 | 18.6 ± 3.4 |
| AEI-CER | 1.50 | 0.99 | 13.0 ± 1.9 |
| PE-Mixed | 0.73 | 0.82 | 15.7 ± 1.2 |
| Symmetric Janus With Catalyst | 0.99 | 1.05 | 16.7 ± 3.5 |
| Symmetric Janus Without Catalyst | 1.14 | 0.91 | 15.6 ± 3.2 |

Manufacture of Janus Bipolar RWs and Incorporation of a Water Dissociation Catalyst The development of single ion-conducting RWs allowed for the manufacture of Janus BP-RWs with adjacent cation and anion exchange layers. Two manufacturing schemes were devised for incorporating a planar coating of a water dissociation catalyst into the RW. The addition of water dissociation catalyst can promote water-splitting during EDI operation and enable greater current flow at lower concentrations of dissolved salt in the diluate chamber.

Figure 9A:
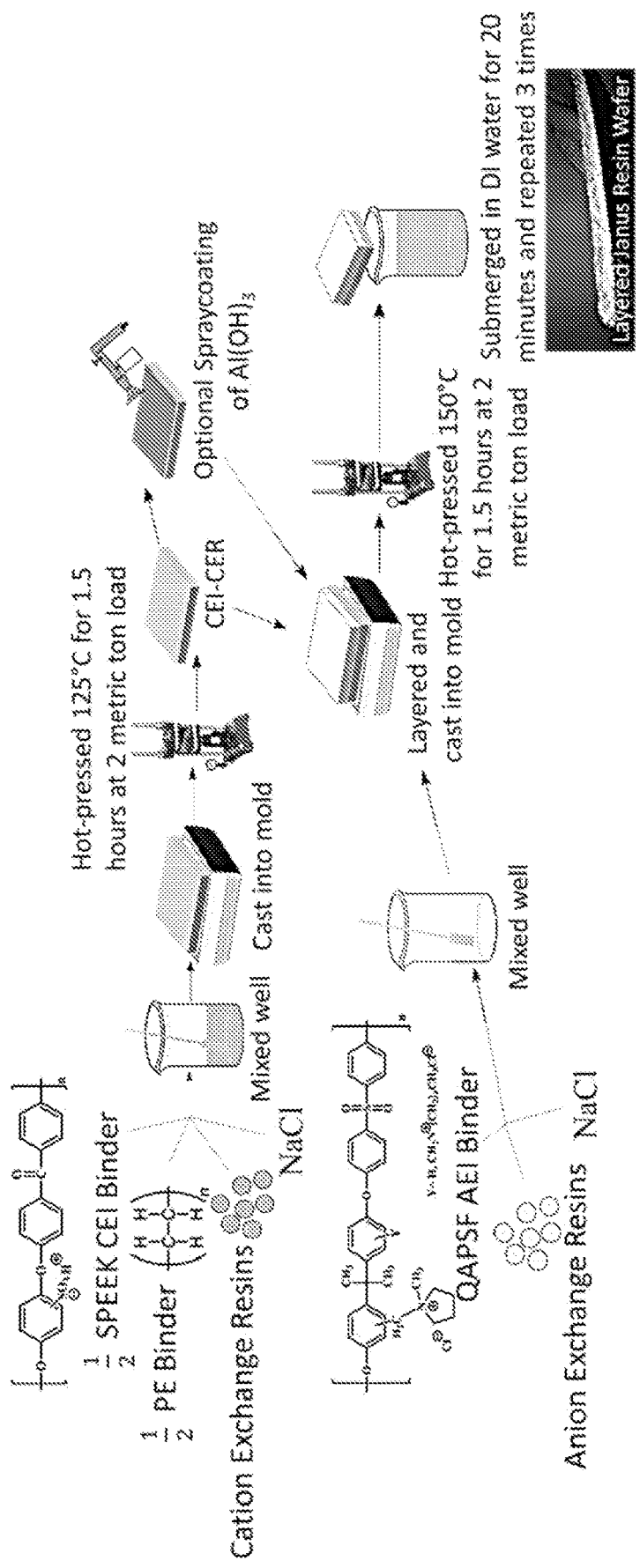
FIGS. 9A and 9B illustrate examples of: (A) a manufacturing scheme for symmetric Janus BP-RW with optional inclusion of a water dissociation catalyst ($Al(OH)_3$ nanoparticles); and (B) a manufacturing scheme for an asymmetric Janus BP-RW with optional inclusion of a water dissociation catalyst, in accordance with various embodiments of the present disclosure.

FIG. 9A illustrates the layering method used to manufacture a symmetric Janus BP-RW. In this approach, the initial CEI-CER layer was prepared as described in FIG. 7B; however, the final submersion in DI water was omitted. After preparing the CEI-CER RW, a uniform layer of aluminum hydroxide (Al(OH)$_3$) nanoparticles (10 wt % of particles suspended in DI water) was applied on to the CEI-CER layer with a final loading of 0.034 g cm$^{-2}$. The catalyst layer was deposited in three applications and allowed to dry for 30 minutes after each application. The CEI-CER layer was inserted into a foil-lined stainless-steel mold, and the AEI-AER mixture described in FIG. 7B was layered on top. The symmetric Janus bipolar RW was dried at 60° C. for 12 hours, hot pressed at 150° C. for 1.5 hours, and allowed to cool under load to room temperature. The final symmetric Janus bipolar was submerged in DI water for a total of 1 hour, during which the water was exchanged three times to remove the porosigen. A photo of the symmetric Janus bipolar RW is shown in FIG. 9A. The darker and lighter sides of the RW correspond to the cation and anion exchange layers, respectively.

Figure 9B:
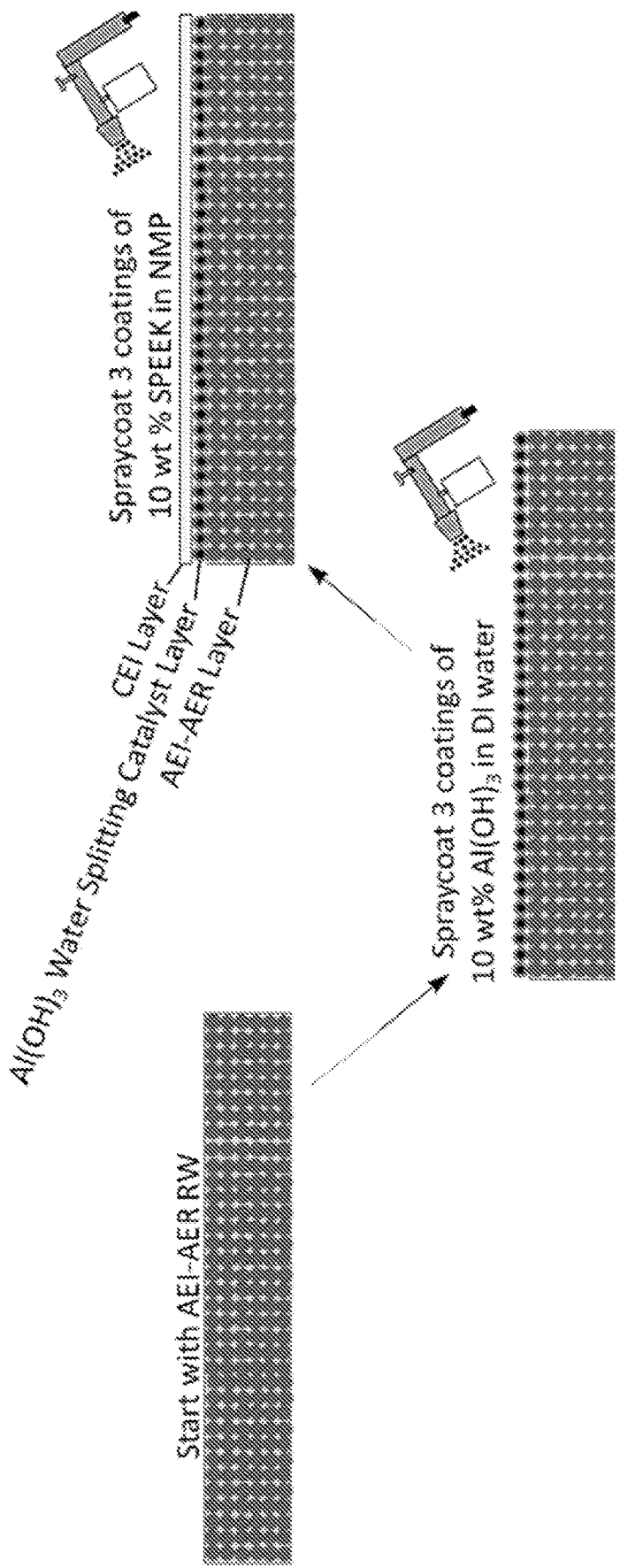

The second manufacturing method for preparing the asymmetric Janus BP-RW is shown in FIG. 9B. Unlike the symmetric RW, the AEI-AER was first prepared as detailed in FIG. 7B, omitting the water immersion step. Next, the water dissociation catalyst was added in the same fashion as described for FIG. 9A. Rather than applying the oppositely charged CEI-CER on top of the AEI-AER with a water dissociation catalyst, a thin film of SPEEK ionomer was deposited through three applications of spray deposition (10 wt % SPEEK in NMP) with a final loading of 0.14 g cm$^{-2}$. The rationale for selecting the asymmetric Janus BP-RW variant was based on i) the previous ionic conductivity results, which showed that the AEI-AER had the highest ionic conductivity (FIG. 8A), and ii) the straightforward nature of this manufacturing procedure, which involved fewer processing steps to incorporate a bipolar junction and water dissociation catalyst.

Figure 10A:
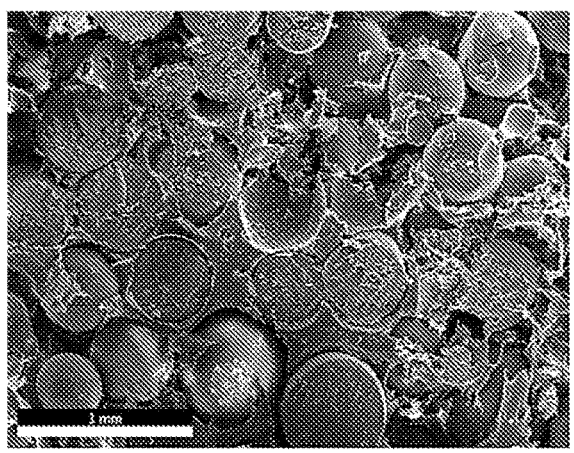
FIGS. 10A-10F are electron micrographs of a symmetric Janus BP-RW interface without a catalyst including: (A) no EDX mapping; (B) chlorine (Cl) EDX map (anion exchange layer); (C) sodium (Na) EDX map (cation exchange layer); (D) sulfur EDX map; and electron micrographs of symmetric Janus BP-RW interfaces including: (E) without EDX mapping and (F) EDX mapping of Cl, Na, and aluminum (Al), in accordance with various embodiments of the present disclosure.
Figure 10B:
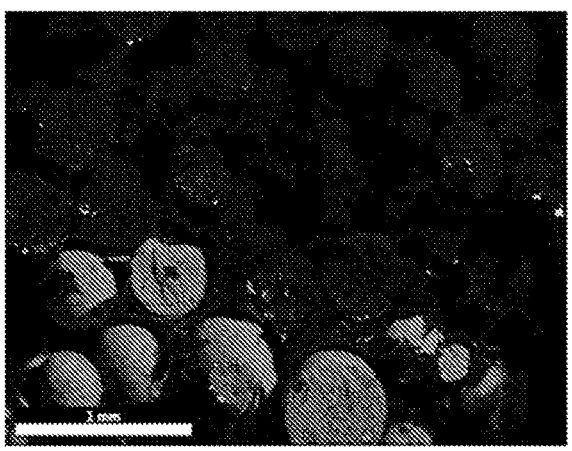
Figure 10C:
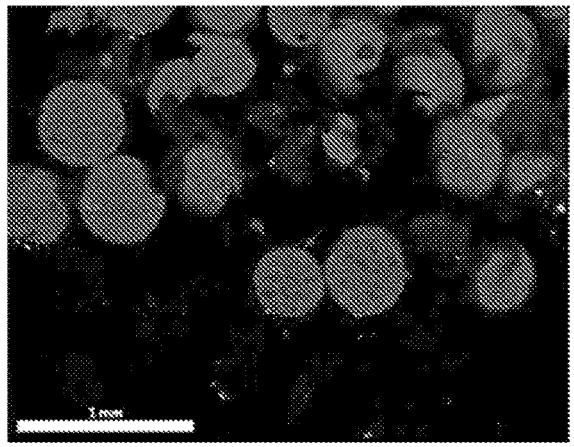
Figure 10D:
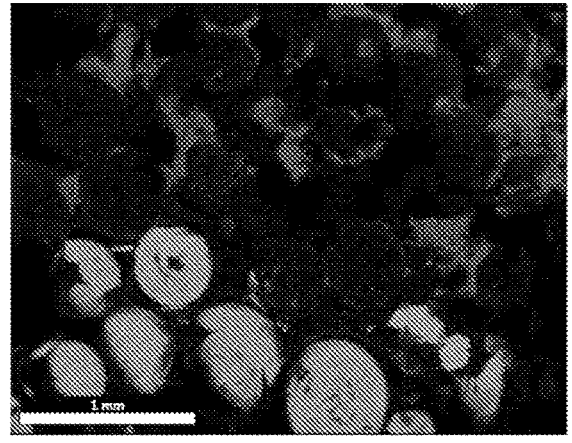

FIGS. 10A-10D. present examples of the electron micrographs, with and without EDX mapping, at the interface between cation exchange and anion exchange groups in the symmetric Janus bipolar RW that did not contain a water dissociation catalyst. FIG. 10A confirms successful integration of the AEI-AER and CEI-CER; the two porous layers are in contact with each other. Elemental mapping for sodium and chlorine in these micrographs, FIGS. 10B and 10C respectively, revealed separate and distinct cation and anion exchange layers (i.e., an abrupt, oppositely charged molecular bipolar junction interface). Sodium is the counterion to the tethered sulfonate groups in the CEI-CER material, while chloride is the counterion for the tethered quaternary ammonium groups used in the AEI-AER. FIG. 10D shows the EDX mapping for sulfur, which is present as sulfonic groups CER and CEI, and as a minor component in AEI due to the poly(arylene ether sulfone) backbone. As a result, a stronger signal for sulfur is evident in the CEI-CER layer in comparison to the AEI-AER layer.

Figure 10E:
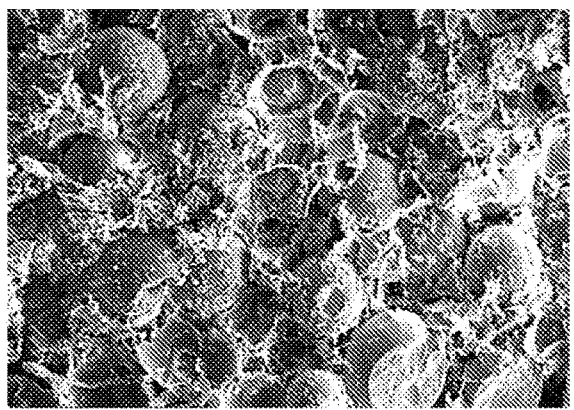
Figure 10F:
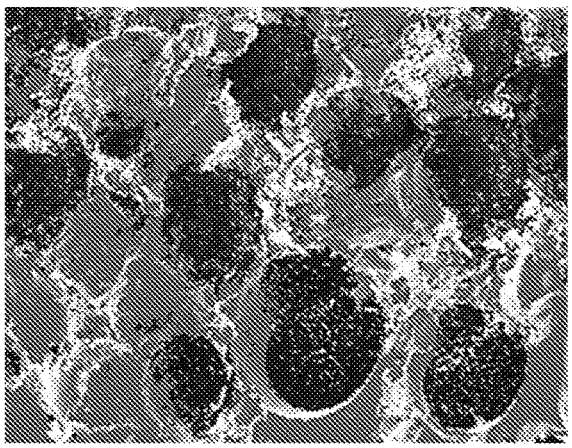

When manufacturing the symmetric Janus bipolar RW, it was discovered that the mechanical-thermal lamination press time was an important parameter. Excessive press times, such as 2 hours or greater, resulted in mixing of CEI and AEI binders and precluded the formation of an abrupt bipolar junction layer. A 1.5-hour press time at 150° C. was determined to be ideal because it yielded an intimate, but distinct, bipolar junction. Plus, the two different RWs were now adjoined into one mechanically robust RW (i.e., the symmetric Janus bipolar RW sample). With a successful manufacturing scheme in place, the Janus bipolar RW with a water dissociation catalyst was prepared and imaged with SEM and EDX mapping (FIGS. 10E and 10F). From these SEM images, it is evident that the sodium and chlorine layers are separated by an aluminum layer at the interface.

Ionic Conductivity of Janus Bipolar RWs

Figure 11A:
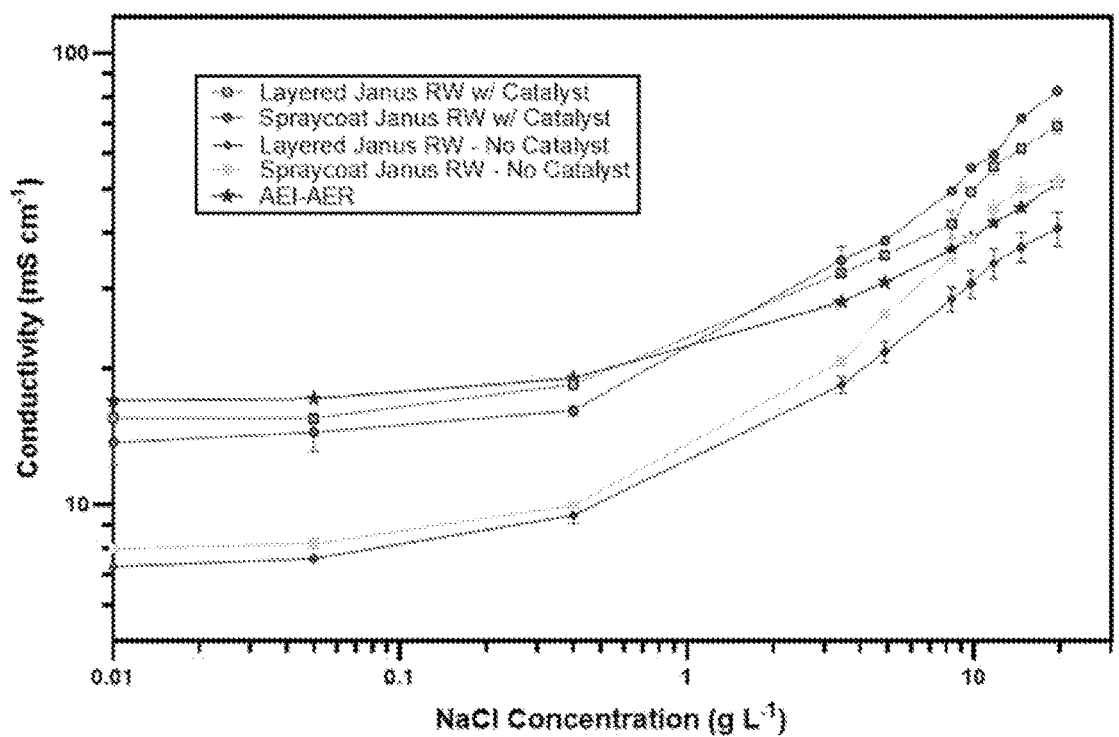
FIG. 11A illustrates examples of ionic conductivity of symmetric and asymmetric Janus BP-RWs with and without water dissociation catalyst, in accordance with various embodiments of the present disclosure. Error bars represent absolute difference (n=2) from the average of measurements.
Figure 11B:
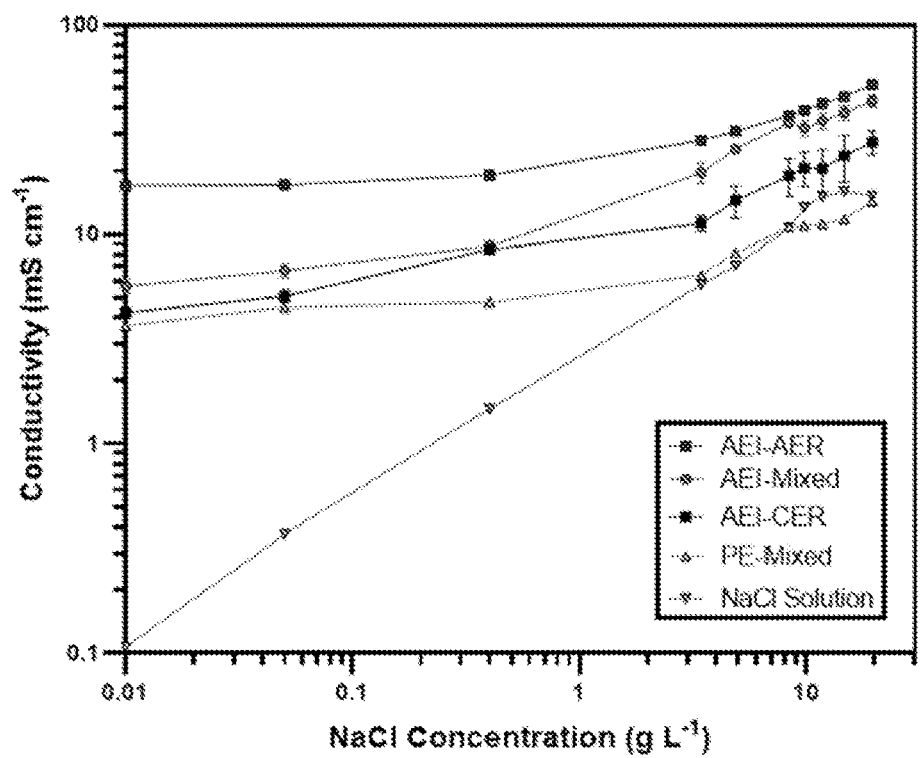
FIG. 11B illustrates examples of ionic conductivity of RWs formulated with CER, AER, and a mixture of both types of ion-exchange resins with AEI binder, in accordance with various embodiments of the present disclosure.

FIG. 11A presents examples of the ionic conductivity values of the symmetric and asymmetric Janus BP-RWs with and without the Al(OH)$_3$ water dissociation catalyst. The Janus RWs were benchmarked against the AEI-AER, which was previously found to be the most conductive RW (FIG. 8A). Both the symmetric and asymmetric Janus RWs without the water dissociation catalyst demonstrated lower ionic conductivities in comparison to the AEI-AER. The decreased conductivity for the layered Janus RW was expected because control experiments with RWs featuring an AEI binder and CER only or a mixture of CER-AER had lower ionic conductivity. FIG. 11B illustrates examples of ionic conductivity of RWs formulated with CER, AER, and a mixture of both types of ion-exchange resins with AEI binder. AEI-AER had the highest ionic conductivity. The addition of CER to the AEI-AER matrix (or replacement of AER with CER) reduced the ionic conductivity. The lower ionic conductivity of the RW samples containing CER was ascribed to the lower ionic mobility of the Na$^+$ that is primarily transferred by the CER.

The addition of the Al(OH)$_3$ water dissociation catalyst into the symmetric and asymmetric Janus BP-RW samples increased their ionic conductivity values to those comparable with the AEI-AER RW at low NaCl concentrations (<3 g L$^{-1}$). At higher NaCl concentrations (>3 g L$^{-1}$), the Janus BP-RWs had slightly higher ionic conductivity values when compared to the AEI-AER. The increase in ionic conductivity with the addition of $Al(OH)_3$ into the RW was unexpected because the $Al(OH)_3$ does not contain any formal ionic charges. However, $Al(OH)_3$ can accept an $OH^-$ from solution to form an ionic pair between $Al(OH)_4^-$ and $H^+$. If these ionic pairs exist in small populations on the nanoparticle surfaces, they could potentially augment the ionic conductivity of the RW sample.

Water-Splitting Characterization of Janus Bipolar RWs in a 4-Pt Cell Setup

Figure 12:
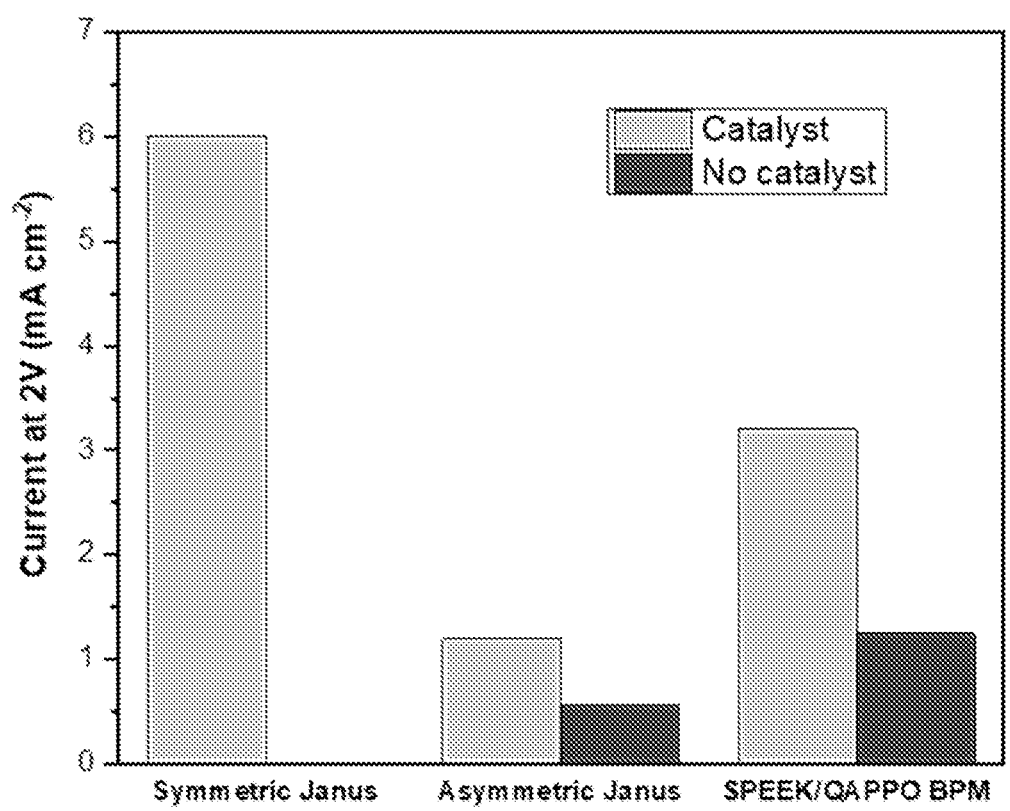
FIG. 12 illustrates examples of current response for a 2 V drop across Janus BP-RW samples with and without a water dissociation catalyst (left and middle bar graphs), in accordance with various embodiments of the present disclosure. For reference, measurements were also performed with homemade BPM with and without a water dissociation catalyst ($Al(OH)_3$). The measurements were carried out in a homemade 4-point cell with two reference electrodes measuring the potential drop across the RW/BPMs and Pt/Ir mesh working electrodes in 0.5 M $Na_2SO_4$.

Most studies that report water-splitting in EDI draw this conclusion from measuring shifts in the effluent pH. However, a 4-point, two-compartment cell is often used for assessing the water-splitting capabilities of BPMs, a class of ion-exchange materials used for generating $H^+$ and $OH^-$, through acquisition of steady-state polarization behavior. FIG. 12 shows the current response for a 2 V potential drop across the Janus BP-RW samples with and without a water dissociation catalyst in a homemade 4-point, two-compartment cell that features platinum-iridium (Pt/Ir) mesh working electrodes and two silver-silver chloride (Ag/AgCl) reference electrodes. The supporting electrolyte for the experiments was 0.5 M sodium sulfate ($Na_2SO_4$), and the 2 V potential drop across the RW samples was selected because it was well-above the minimum thermodynamic potential (0.83 V) to split water into $H^+$ and $OH^-$. FIG. 12 clearly shows that the addition of a water dissociation catalyst enhanced the current response by at least a factor of two (and in the case of symmetric Janus RW, it was over 100). The high ionic conductivities and exceptional water-splitting capabilities of the Janus BP-RWs suggested that these materials would be good candidates for additional investigation in an EDI process.

EDI Demonstrations

Figure 13A:
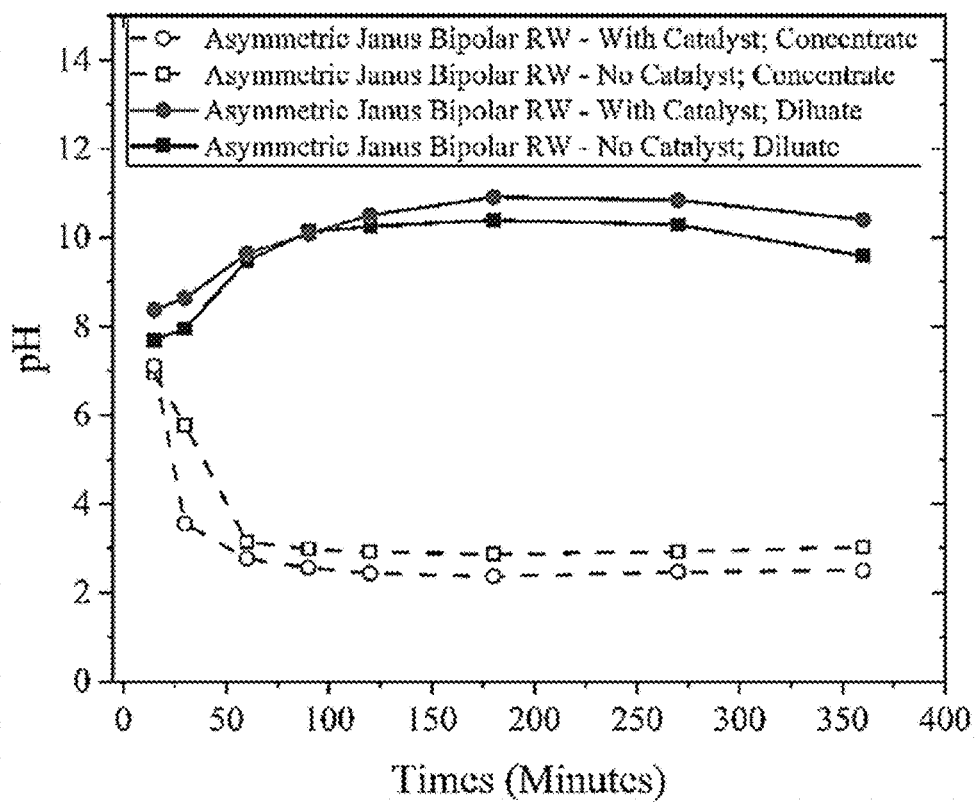
FIGS. 13A-13D illustrate examples of: (A) pH of concentrate and diluate chambers during EDI demonstration versus recirculation time for asymmetric Janus BP-RW with and without a water dissociation catalyst; (B) proton concentration in concentrate chamber during the EDI demonstration; (C) hydroxide concentration in diluate chamber during the EDI demonstration; and (D) EDI performance as measured by the removal of chloride salt anions from the diluate chamber to the concentrate chamber with an asymmetric Janus BP-RW with and without a water dissociation catalyst, in accordance with various embodiments of the present disclosure.

Bench-scale RW-EDI experiments were conducted in order to evaluate the water-splitting capabilities of an asymmetric Janus BP-RW featuring a water dissociation catalyst. Control EDI experiments were also performed with an asymmetric Janus BP-RW that did not contain the $Al(OH)_3$ water dissociation catalyst. The asymmetric Janus bipolar RW was selected over the symmetric Janus BP-RW because the manufacturing procedure was simpler and produced more mechanically robust RWs. EDI demonstrations were performed in batch mode with synthetic aqueous NaCl solutions (initial concentration for the diluate and concentrate chambers was 5 g $L^{-1}$). The diluate and concentrate solutions were continuously recirculated for the duration of each the EDI demonstration. The pH of diluate and concentrate streams were monitored throughout the experiment, and the results are presented in FIG. 13A. In FIG. 13A, the pH of the diluate stream increased while the pH of the concentrate stream decreased. Changes in pH are consistent with water-splitting that yields $H^+$ and $OH^-$. This phenomenon has been documented for various applications of EDI processes by monitoring solution pH. Notably, the relative changes in pH values were higher for the experiment that used a RW featuring a water dissociation catalyst. It appears that no EDI process has incorporated a water dissociation catalyst in the ion-exchange resin bed. The pH data presented in FIG. 13A shows that the incorporation of a catalyst improved the water-splitting rate.

Figure 13B:
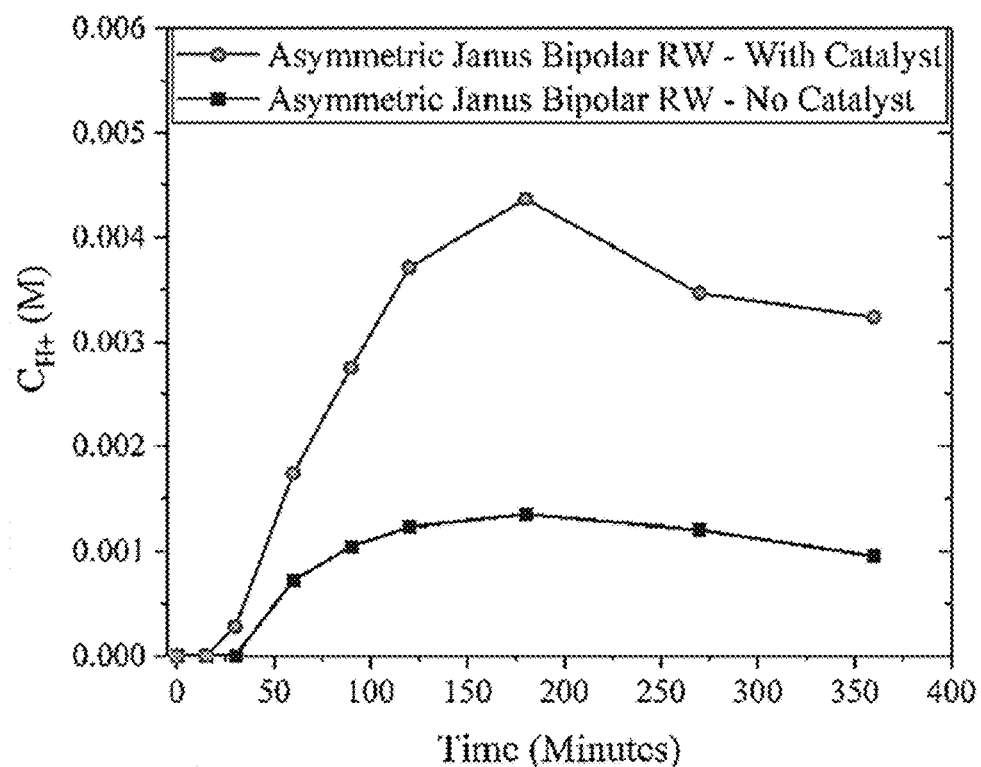
Figure 13C:
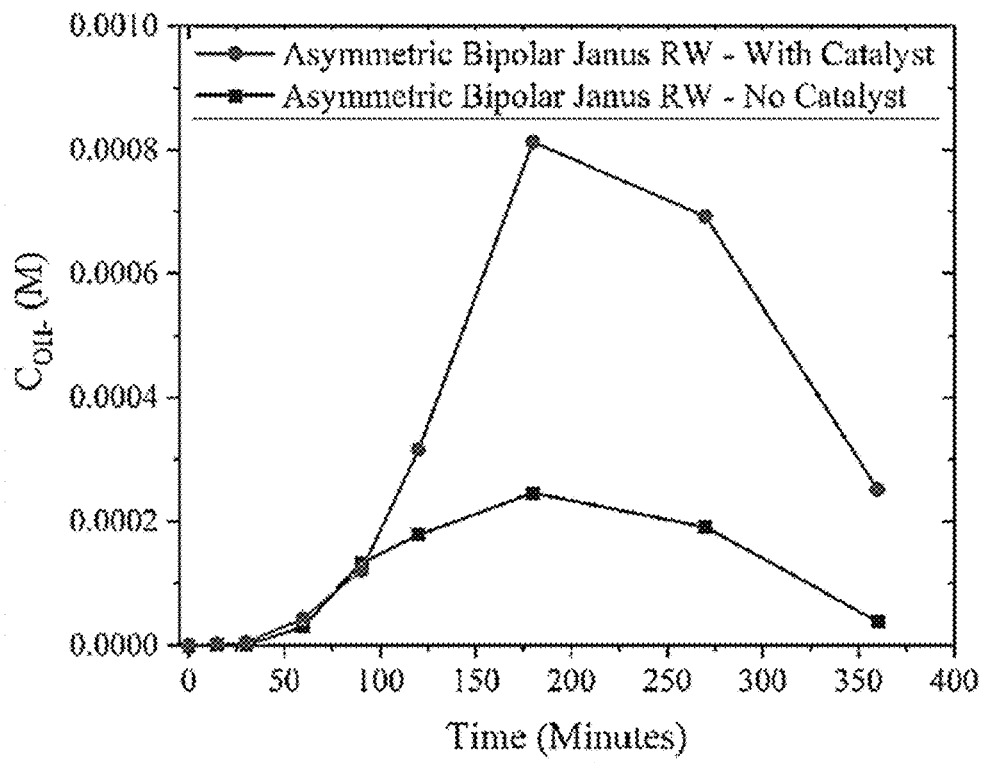

Owing to the small changes on a logarithmic scale, pH values were converted to $H^+$ in the concentrate and $OH^-$ in the diluate (FIGS. 13B & 13C). From these plots, it is clear that the increase in acidity in the concentrate and alkalinity in the diluate is greater by a factor of 3-4 for a Janus BP-RW sample containing a water dissociation catalyst. The reduction in diluate alkalinity over time resulted from the depletion of $Cl^-$ (near 80% removal) from the diluate chamber (FIG. 13D) and thus, continual deionization required removal of accumulated $OH^-$ in the diluate chamber through the AEM to maintain electrical current flow in the EDI.

Figure 13D:
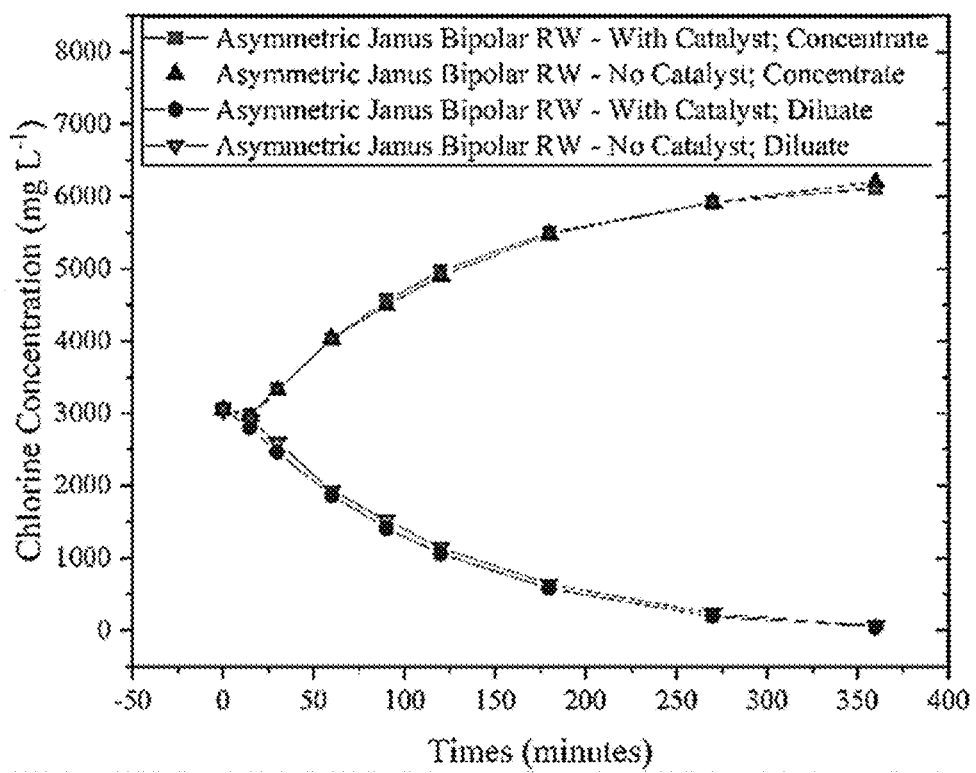

Aside from changes in pH, desalination performance was evaluated for asymmetric Janus BP-RWs both with and without water splitting catalyst. FIG. 13D shows that as expected in both cases, the $Cl^-$ concentration in the diluate compartment decreased with time while the $Cl^-$ concentration in the concentrate compartment increased with time. The $Cl^-$ concentration profiles for wafers with and without the water splitting catalyst were not significantly different, which suggest that the inclusion of the catalyst does not necessarily facilitate $Na^+$ or $Cl^-$ ion transport. This can be attributed to the 3-7× higher ion mobility for $H^+$ and $OH^-$ in comparison to $Na^+$ and $Cl^-$ in water, which have been reported to parallel the trends in ion-exchange resins.

In summary, the EDI tests showed that asymmetric Janus BP-RWs featuring $Al(OH)_3$ as a water dissociation catalyst promoted greater water-splitting in comparison to similar Janus BP-RWs that lack the catalyst but did not affect $Cl^-$ deionization. Overall, these results imply that Janus RW materials may be an appropriate substitute for EDI processes that utilize BPMs, analogous to BPM electrodialysis but without the need to use high feed concentrations to minimize spacer channel resistances. In addition, the manufacturing process for making Janus BP-RWs is amenable (illustrated in FIGS. 14A-14D), so it is possible to place multiple layers of the water dissociation catalyst in the RW to modulate the water-splitting phenomenon and the pH values of the diluate and concentrate chambers (i.e., the distances that $OH^-$ and $H^+$ must traverse in order to reach membrane surfaces could be modulated). FIGS. 14A-14D illustrate cross-sectional views of (A) symmetric and (B) asymmetric Janus bipolar resin wafers and concepts of (C) reversed asymmetric and (D) bilayer Janus bipolar resin wafers. Controlling the solution pH through the use of altered materials can enable niche separation applications such as silica removal and organic acid capture.

A new class of single ion-conducting RWs was developed to foster cation or anion conduction. Ionic conductivity measurements demonstrated the AEI-AER RW was the most conductive RW in dilute NaCl solutions reported to date (17±0.26 mS $cm^{-1}$ in 0.1 g $L^{-1}$ NaCl). Further, the new single ion-conducting materials revealed that ion exchange resins (and not only the ionomer binder) provide a substantial contribution to the overall RW conductivity, and the current commercially available CER is less conductive than the AER. Solutions can be determined that are focused on improving cation conductivity within RWs and molecularly engineered percolation pathways with the overall goal of promoting more efficient electrochemical separations.

Additionally, Janus BP-RWs were explored by the development of the single ion-conducting of RWs. The addition of a water dissociation catalyst into a molecularly intimate polycation-polyanion bipolar junction interfaces located in porous RW materials was investigated for the first time. The water dissociation catalyst enhanced the conductivity of the RW, and these Janus wafers rivaled the conductivity of the most conductive single ion-conducting RW (AEI-AER). The EDI demonstration of the asymmetric Janus RW showed that these materials can be utilized to modify the solution pH and suggest that pH control with RW material could be useful to enable electrodeionization separation technologies that may compete with bipolar membrane electrodialysis.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A wafer, comprising:
an ion conducting layer comprising:
  ion-exchange resin particles; and
  an ionomer binder coating the ion-exchange resin particles, the ionomer binder binding the ion-exchange resin particles together in the ion conducting layer, wherein the ionomer binder comprises an anion-exchange ionomer (AEI), wherein the AEI comprises quaternary benzyl n-methyl pyrrolidinium chloride poly(arylene ether sulfone).

2. The wafer of claim 1, wherein the ion-exchange resin particles comprise a plurality of ion-exchange resin particle types.

3. The wafer of claim 1, wherein the ionomer binder comprises a cation-exchange ionomer (CEI).

4. The wafer of claim 3, wherein the CEI comprises sodium sulfonate poly(ether ether ketone) (SPEEK).

5. The wafer of claim 1, comprising a catalyst layer disposed on the ion conducting layer.

6. The wafer of claim 5, wherein the ion conducting layer comprises a water dissociation catalyst.

7. The wafer of claim 6, wherein the water dissociation catalyst comprises $Al(OH)_3$ nanoparticles.

8. The wafer of claim 5, comprising an ion-exchange layer disposed on the catalyst layer opposite the ion conducting layer.

9. The wafer of claim 8, wherein the ion-exchange resin particles are anion exchange resin particles, and the ion-exchange layer comprises a cation-exchange ionomer (CEI).

10. The wafer of claim 9, wherein the catalyst layer is located between the ion conducting layer and a second ion conducting layer, the second ion conducting layer comprising:
cation-exchange resin particles; and
a cation-exchange ionomer coating the cation-exchange resin particles, the cation-exchange ionomer binding the cation-exchange resin particles together in the second ion conducting layer.

11. The wafer of claim 1, comprising a second ion conducting layer comprising:
second ion-exchange resin particles; and
a second ionomer binder coating the second ion-exchange resin particles, the second ionomer binder binding the second ion-exchange resin particles together in the second ion conducting layer.

12. The wafer of claim 11, comprising an ion-exchange layer located between the ion conducting layer and the second ion conducting layer.

13. The wafer of claim 12, wherein the ion conducting layer is an anion conducting layer, the second ion conducting layer is a cation conducting layer, and the ion-exchange layer comprises a cation-exchange ionomer (CEI).

* * * * *